(12) United States Patent
Masuji et al.

(10) Patent No.: US 6,965,389 B1
(45) Date of Patent: Nov. 15, 2005

(54) IMAGE DISPLAYING WITH MULTI-GRADATION PROCESSING

(75) Inventors: Shigehiro Masuji, Matsudo (JP); Hideki Aiba, Moriya-Machi (JP)

(73) Assignee: Victor Company of Japan, Ltd., (JP)

( * ) Notice: Subject to any disclaimer, the term of this patent is extended or adjusted under 35 U.S.C. 154(b) by 1025 days.

(21) Appl. No.: 09/655,682

(22) Filed: Sep. 6, 2000

(30) Foreign Application Priority Data

| Sep. 8, 1999 | (JP) | ................................. 11-253920 |
| Sep. 24, 1999 | (JP) | ................................. 11-270116 |
| Oct. 1, 1999 | (JP) | ................................. 11-281224 |
| Oct. 18, 1999 | (JP) | ................................. 11-294970 |
| Oct. 20, 1999 | (JP) | ................................. 11-297922 |

(51) Int. Cl.$^7$ ............................................. G09G 5/10
(52) U.S. Cl. ...................... 345/690; 345/590; 345/596; 345/600; 358/1.9; 358/518
(58) Field of Search .......................... 345/63, 204, 596, 345/600, 605, 690–693, 616; 348/612, 618, 348/624, 627; 362/167, 274, 275; 358/533, 358/534, 518, 519, 521; 318/1–9

(56) References Cited

U.S. PATENT DOCUMENTS

| 5,181,100 A | * | 1/1993 | Hodgson ..................... 348/594 |
| 5,757,517 A | * | 5/1998 | Couwenhoven et al. ..... 358/463 |
| 6,040,876 A | * | 3/2000 | Pettitt et al. ................. 348/624 |
| 6,064,366 A | * | 5/2000 | Millward et al. ............ 345/691 |
| 6,069,609 A | * | 5/2000 | Ishida et al. ................. 345/596 |
| 6,069,610 A | * | 5/2000 | Denda et al. ................ 345/694 |
| 6,310,588 B1 | * | 10/2001 | Kawahara et al. ............ 345/63 |
| 6,414,657 B1 | * | 7/2002 | Kasahara et al. ............. 345/63 |

(Continued)

FOREIGN PATENT DOCUMENTS

JP      60-171888      9/1985      ............ H04N 9/68

(Continued)

Primary Examiner—Henry N. Tran
(74) Attorney, Agent, or Firm—Renner, Kenner, Greive, Bobak, Taylor & Weber

(57) ABSTRACT

A video signal processing apparatus processes an input video signal for displaying an image based on the video signal. Detected is a gradation level of the input video signal. A color saturation level of the input video signal is depressed in a predetermined color saturation level range only when the detected gradation level is located in a predetermined gradation level range. A first input video signal having a first gradation level (or number of bits) is converted into a second video signal having a second gradation level (or number of bits) that is lower (or smaller) than first gradation level (or number of bits), for displaying an image based on the input video signal. Error data is generated in response to a data portion of the first input video signal. The data portion corresponds to a difference between the first and the second gradation levels (or number of bits). The error data is obtained by multiplying the data portion by predetermined error diffusion coefficients according to pixel dots that surround a pixel dot composed of R(red)-, G(green)- and B(blue)-signal components of the first input video signal. At least one of the number of bits of the error diffusion coefficients for one of the R-, G- and B-signal components is different from the other number of bits of the error diffusion coefficients for the other signal components The generated error data is added to the first input video signal to convert the first input video signal into the second video signal. Reverse-gamma correction may be applied to the first input video signal before conversion.

10 Claims, 22 Drawing Sheets

U.S. PATENT DOCUMENTS 6,476,824 B1 * 11/2002 Suzuki et al. ................ 345/690

FOREIGN PATENT DOCUMENTS

| | | | | |
|---|---|---|---|---|
| JP | 62-220087 | 9/1987 | ............ | H04N 9/64 |
| JP | 63(1988)-33283 | 3/1988 | ............ | H04N 9/79 |
| JP | 05-236496 | 9/1993 | ............ | H04N 9/68 |
| JP | 06-046290 | 2/1994 | ........... | H04N 5/202 |
| JP | 06-289810 | 10/1994 | ............ | G09G 3/20 |
| JP | 06-318051 | 11/1994 | ............ | G09G 3/20 |
| JP | 1995-07064505 | 3/1995 | ............ | G09G 3/20 |
| JP | 1995-07140924 | 6/1995 | ............ | G09G 3/20 |
| JP | 08-204954 | 8/1996 | ............ | H04N 1/40 |
| JP | 09-101771 | 4/1997 | ............ | G09G 5/36 |
| JP | 1997-09198000 | 7/1997 | ............ | G09G 3/20 |
| JP | 1999-11003057 | 1/1999 | ............ | G09G 3/20 |

* cited by examiner (Yi>Yip)

(Yi≦Yip)

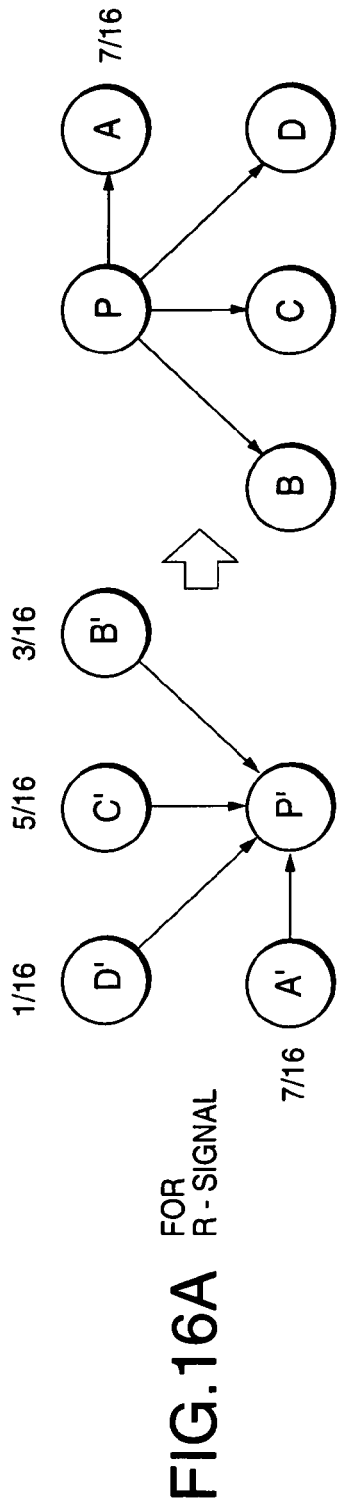
FIG.16A FOR R-SIGNAL
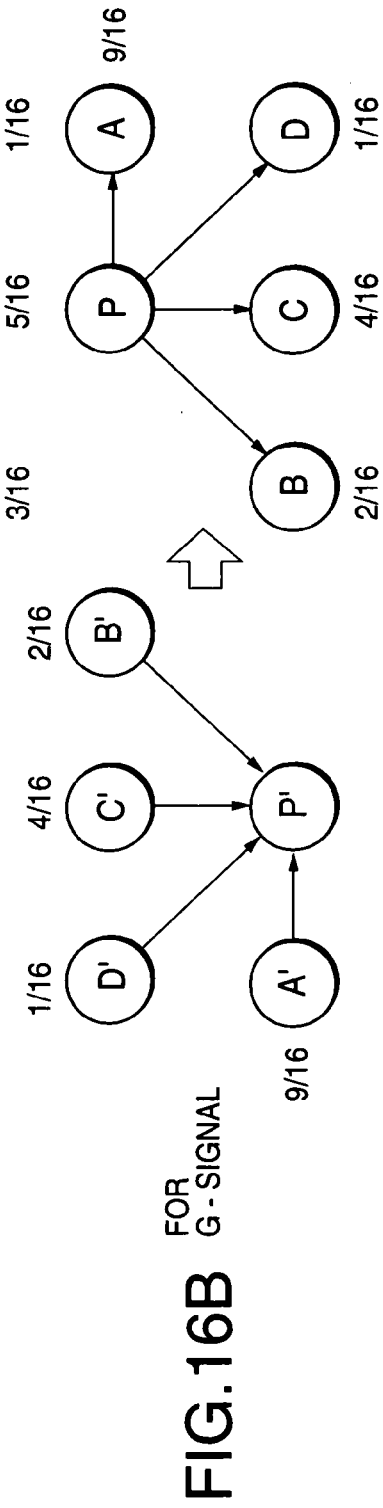
FIG.16B FOR G-SIGNAL
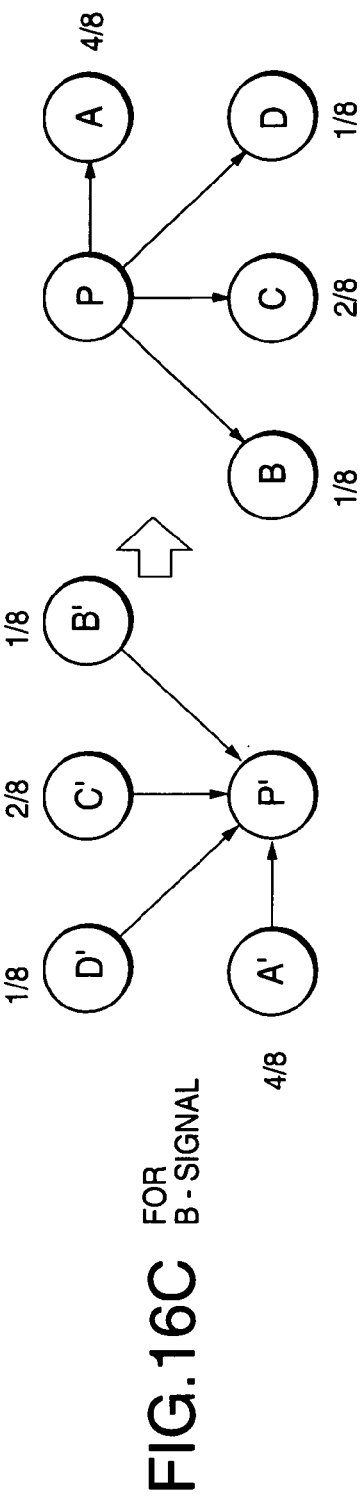
FIG.16C FOR B-SIGNAL

IMAGE DISPLAYING WITH MULTI-GRADATION PROCESSING

BACKGROUND OF THE INVENTION

The present invention relates to an image displaying apparatus for displaying images with digitally limited intermediate gradation levels, such as, plasma display panels (PDP), field emission display (FED)s, digital micro mirror devices (DMD) and electroluminescence displays (EL), and video signal processor. This invention also relates to video signal processing and error diffusion (variance) processing used for such image displaying apparatus.

Among image displaying apparatus, matrix-type image displaying apparatus, such as, a PDP for displaying images with gradation by dividing one field into sub-fields, a FED for displaying images with gradation by pulse-width modulation (PWM), and also a DMD, display images only at digitally-limited intermediate gradation levels.

Television broadcast generally provides gamma correction at the transmission side for cathode-ray tubes (CRTs) as receivers to achieve the linear characteristics with the reverse-gamma characteristics of CRTs at the reception side.

Contrary to this, image displaying apparatus that display images at digitally-limited intermediate gradation levels as listed above them-selves have the linear characteristics. Such image displaying apparatus thus require reverse-gamma correction to the 2.2 power to input video signals to regain the linear characteristics for displaying images with the gradation characteristics similar to that for CRTs.

These image displaying apparatus may receive input signals at gradation levels, the number of which (the number of bits) is larger than that can be displayed by the image displaying apparatus. These image displaying apparatus may decrease the number of gradation levels (the number of bits) to be displayed so that it is smaller than the number of gradation levels (the number of bits) for input signals. Moreover, the image displaying apparatus may increase the number of bits so that it is larger than that the displaying apparatus are capable of displaying when regaining the linear characteristics by reverse-gamma correction.

Decrease in the number of bits (gradation levels) is thus required when the number of bits (the first number of gradation levels) of input video signals or reverse-gamma-corrected video signals is larger than that (the second number of gradation levels) the image displaying apparatus being capable of displaying. Such a decrease however loses gradation; hence multi-gradation processing with error diffusion is required.

Multi-gradation processing by way of error diffusion is performed as discussed below with reference to FIG. 1 for displaying images corresponding to the first number of gradation levels larger than the second number of gradation levels explained above.

A dot "P" in FIG. 1 is one of the three dots for constituting a pixel, and has gradation that cannot be expressed at the second number of gradation levels. Dots "A", "B", "C" and "D" are located at the right side of, the left lower side of, under, and the right lower side of the dot "P", respectively.

Multi-gradation processing is generally performed for offering images at quasi-first number of gradation levels by diffusing the gradation levels that corresponds to (the first number of gradation levels—the second number of gradation levels) to the surrounding dots "A" to "D" with a predetermined weighting for the dot "P" that can not be exhibited at the first number of gradation levels.

Displaying images at gradation levels by using the upper 8 bits of 12 bits of dot data by image displaying apparatus capable of displaying images at 8-bit gradation levels is performed by diffusing the dot data of the lower 4 bits of the 12 bits with constant weighting to the surrounding dots "A" to "D" for visual integration to achieve image displaying at gradation levels corresponding to 12 bits.

In FIG. 1, "7/16", "3/16", "5/16" and "1/16" are examples of error diffusion coefficients that represent the degree of weighting. The same error diffusion coefficients are used for the three primary colors R(red), G(green) and B(blue).

Conventional image displaying apparatus as introduced above have the following drawbacks:

Displaying images with reverse-gamma correction to digitally-converted R-, G- and B-video signals, as disclosed above, loses gradation particularly in the low intensity range, thus resulting in discontinuous gradation levels.

Especially, PDPs produce gradation levels by selecting sub-fields with different weighting for luminescence that constitute one field. This causes large differences in intensity among gradation levels, to produce large variation in visual color saturation between close gradation levels in the low intensity range for single color and mixed colors. This results in color pseudo-contour disturbances in image quality or in images with color saturation in which some dot bits have been dropped, particularly, for dark images at flat color saturation levels.

To avoid such phenomena, multi-gradation processing, such as, using dither matrices or error diffusion achieves smooth color saturation in the low intensity range close to black. This processing, however, causes disturbances in image quality, like periodical color pattern noises on black dark images.

Moreover, in order to avoid such phenomena, Japanese Unexamined Patent Publication No. 1997(9)-198000 discloses a method of decreasing color saturation in the low intensity range. This method, however, uniformly decreases color saturation in the low intensity range even for images of a large saturation in the low intensity range, thus producing strange images.

Such drawbacks are revealed not only in the low intensity range, but also partially in the intermediate and high gradation ranges, depending on sub-field selection.

Error diffusion as illustrated in FIG. 1 uses the same error diffusion coefficients to the three primary colors R, G and B, thus causes image disturbances, such as, periodical pattern noises peculiar to error diffusion, especially, for displaying fixed patterns.

Displaying digital video signals generated by personal computers and fixed patterns on PDPs is performed with no error diffusion to avoid lowering in image quality image which would otherwise occur due to disturbances, such as, periodical pattern noises peculiar to error diffusion.

However, conventional displaying apparatus use the same reverse-gamma correction characteristics for multi-gradation processing in spite of error diffusion, or an optimum reverse-gamma correction characteristics for image displaying in combination of reverse-gamma correction and error diffusion. Displaying images without error diffusion thus remarkably loses gradation levels in the low gradation range, thus producing images with remarkably discontinuous gradation levels in which digital bits have been dropped.

SUMMARY OF THE INVENTION

A purpose of the present invention is to provide an apparatus and a method of displaying images in a specific gradation level range, such as, a low gradation level range, with no color quasi edge-like image disturbances, color saturation as if bits have been dropped nor color pattern noises.

Another purpose of the present invention is to provide an apparatus and a method of displaying images with no periodical pattern noises which would be generated by error diffusion processing.

The present invention provides a video signal processing apparatus to process an input video signal for displaying an image based on the video signal including: a detector to detect a gradation level of the input video signal; and a processor to depress a color saturation level of the input video signal in a predetermined color saturation level range only when the detected gradation level is located in a predetermined gradation level range.

Moreover, the present invention provides an apparatus for converting a first input video signal having a first gradation level into a second video signal having a second gradation level that is lower than first gradation level, for displaying an image based on the input video signal including: a generator to generate error data in response to a data portion of the first input video signal, the data portion corresponding to a difference between the first and the second gradation levels, the error data being obtained by multiplying the data portion by predetermined error diffusion coefficients according to pixel dots that surround a pixel dot composed of R(red)-, G(green)- and B(blue)-signal components of the first input video signal, at least one of the error diffusion coefficients for one of the R-, G- and B-signal components being different from the other error diffusion coefficients for the other signal components; and an adder to add the generated error data to the first input video signal, thus converting the first input video signal into the second video signal.

Furthermore, the present invention provides an apparatus for converting a first input video signal having a first number of bits into a second video signal having a second number of bits that is smaller than first number of bits, for displaying an image based on the input video signal including: a generator to generate error data in response at least to a data portion of lower significant bits of the first number of bits of the first input video signal, the lower significant bits corresponding to a difference between the first and the second number of bits, the error data being obtained by multiplying the data portion by predetermined error diffusion coefficients according to pixel dots that surround a pixel dot composed of R(red)-, G(green)- and B(blue)-signal components of the first input video signal, at least one of the number of bits of the error diffusion coefficients for one of the R-, G- and B-signal components being different from the other number of bits of the error diffusion coefficients for the other signal components; and an adder to add the generated error data to the first input video signal, thus converting the first input video signal into the second video signal.

Moreover, the present invention provides a method of displaying an image based on an input video signal. Reverse-gamma correction is applied to an input first video signal. The reverse-gamma correction-applied input first video signal having a first gradation level is converted into a second video signal having a second gradation level that is lower than first gradation level by multi-gradation processing. The signal conversion is switched between a first state in which the input first video signal requires multi-gradation processing and a second state in which the input first video signal does not require multi-gradation processing.

Furthermore, the present invention provides a method of displaying an image based on an input video signal. Reverse-gamma correction is applied to an input first video signal. The reverse-gamma correction-applied input first video signal having a first number of bits is converted into a second video signal having a second number of bits that is smaller than first number of bits by multi-gradation processing. The signal conversion is switched between a first state in which the input first video signal requires multi-gradation processing and a second state in which the input first video signal does not require multi-gradation processing.

Still, furthermore, the present invention provides a method of displaying an image based on an input video signal. Reverse-gamma correction is applied to an input first video signal. Error data is generated in response at least to a data portion of lower significant bits of the first number of bits of the first input video signal. The lower significant bits correspond to a difference between the first and the second number of bits. The error data is obtained by multiplying the data portion by predetermined error diffusion coefficients according to pixel dots that surround a pixel dot composed of R(red)-, G(green)- and B(blue)-signal components of the first input video signal. The generated error data is added to the first input video signal. The first input video signal is thus converted into the second video signal. The signal conversion is halted by setting the generated error data at zero.

Moreover, the present invention provides a method of displaying an image based on an input video signal. Reverse-gamma correction is applied to an input first video signal having a first number of bits. The reverse-gamma correction is provided at least with first reverse-gamma correction characteristics and second reverse-gamma correction characteristics different from the first characteristics. The reverse-gamma correction-applied first input video signal is converted into a second video signal having a second number of bits smaller than the first number of bits, by generating error data in response at least to a data portion of lower significant bits of the first number of bits of the first input video signal. The lower significant bits correspond to a difference between the first and the second number of bits. The error data is obtained by multiplying the data portion by predetermined error diffusion coefficients according to pixel dots that surround a pixel dot composed of R(red)-, G(green)- and B(blue)-signal components of the first input video signal. The generated error data is added to the first input video signal. The conversion of the first input video signal to the second video signal is turned on or off. The reverse-gamma correction is switched between the first and the second reverse-gamma correction characteristics with respect to a first state in which the input first video signal requires the input video signal conversion and a second state in which the input first video signal does not require the input video signal conversion. All the lower significant bits of the first input video signal are set at zero to turn off the signal conversion to achieve the second state.

Furthermore, the present invention provides a method of displaying an image based on an input video signal. Reverse-gamma correction to an input first video signal having a first number of bits. The reverse-gamma correction is provided at least with first reverse-gamma correction characteristics and second reverse-gamma correction characteristics different from the first characteristics. The reverse-gamma correction-applied first input video signal is converted into a second video signal having a second number of bits smaller than the first number of bits, by generating error data in response at least to a data portion of lower significant bits of the first number of bits of the first input video signal. The lower significant bits correspond to a difference between the first and the second number of bits.

The error data is obtained by multiplying the data portion by predetermined error diffusion coefficients according to pixel dots that surround a pixel dot composed of R(red)-, G(green)- and B(blue)-signal components of the first input video signal. The generated error data is added to the first input video signal. The conversion of the first input video signal to the second video signal is turned on or off. The reverse-gamma correction is switched between the first and the second reverse-gamma correction characteristics with respect to a first state in which the input first video signal requires multi-gradation processing and a second state in which the input first video signal does not require multi-gradation processing. All the generated error data are set at zero to turn off the signal conversion to achieve the second state.

Still, furthermore, the present invention provides an apparatus of displaying an image based on an input video signal having a reverse-gamma corrector to apply reverse-gamma correction to the input video signal, the reverse-gamma corrector being provided with at least first and second reverse-gamma correction characteristics each representing a relationship between an input gradation level and an output gradation level, the first characteristics being composed of a first straight line having a first gradient from an input gradation level zero to a predetermined input gradation level, the second characteristics being composed of a second straight line having a second gradient from the input gradation level zero to the predetermined input gradation level, the first and the second gradient being different from each other, each straight line being followed by a curve at the predetermined input gradation level.

Moreover, the present invention provides an apparatus of displaying an image based on an input video signal including: a first processor to apply reverse-gamma correction to an input first video signal having a first number of bits, the reverse-gamma corrector being provided with at least first and second reverse-gamma correction characteristics each representing a relationship between an input gradation level and an output gradation level, the first characteristics being composed of a first straight line having a first gradient from an input gradation level zero to a predetermined input gradation level, the second characteristics being composed of a second straight line having a second gradient from the input gradation level zero to the predetermined input gradation level, the first and the second gradient being different from each other, each straight line being followed by a curve at the predetermined input gradation level; a second processor having at least a first and a second generator to convert the first input video signal into a second video signal having a second number of bits smaller than the first number of bits, each generator generating error data in response at least to a data portion of lower significant bits of the first number of bits of the first input video signal, the lower significant bits corresponding to a difference between the first and the second number of bits, the number of the lower significant bits being different from each other between the first and the second generators, the error data being obtained by multiplying the data portion by predetermined error diffusion coefficients according to pixel dots that surround a pixel dot composed of R(red)-, G(green)- and B(blue)-signal components of the first input video signal, the generated error data being added to the first input video signal; and a switch to switch the first processor between the first and the second reverse-gamma correction characteristics, thus generating a switching signal, in response to the switching signal, the second processor being switched between the first and the second generators with respect to the different number of bits of the lower significant bits.

Moreover, the present invention provides an apparatus of displaying an image based on an input video signal including: a first processor to apply reverse-gamma correction to an input first video signal having a first number of bits, the reverse-gamma corrector having reverse-gamma correction characteristics representing a relationship between an input gradation level and an output gradation level, the characteristics being composed of a straight line having a gradient $1/t$ ($T \geq 1$) from an input gradation level zero to a predetermined input gradation level, the straight line being followed by a curve at the predetermined input gradation level; and a second processor to convert the first input video signal into a second video signal having a second number of bits smaller than the first number of bits, by generating error data in response at least to a data portion of lower significant bits "n" ($t=2^n$) of the first number of bits of the first input video signal, if "n" including decimal places, the decimal places being rounded down, the lower significant bits corresponding to a difference between the first and the second number of bits, the error data being obtained by multiplying the data portion by predetermined error diffusion coefficients according to pixel dots that surround a pixel dot composed of R(red)-, G(green)- and B(blue)-signal components of the first input video signal, the generated error data being added to the first input video signal.

BRIEF DESCRIPTION OF DRAWINGS

FIGS. 16A, 16B and 16C illustrate another error diffusion processing in the third preferred embodiment of an mage displaying apparatus according to the present invention;

DETAILED DESCRIPTION OF PREFERRED EMBODIMENTS

Preferred embodiments according to the present invention will be disclosed with reference to the attached drawings.

The First Preferred Embodiment

Figure 1:
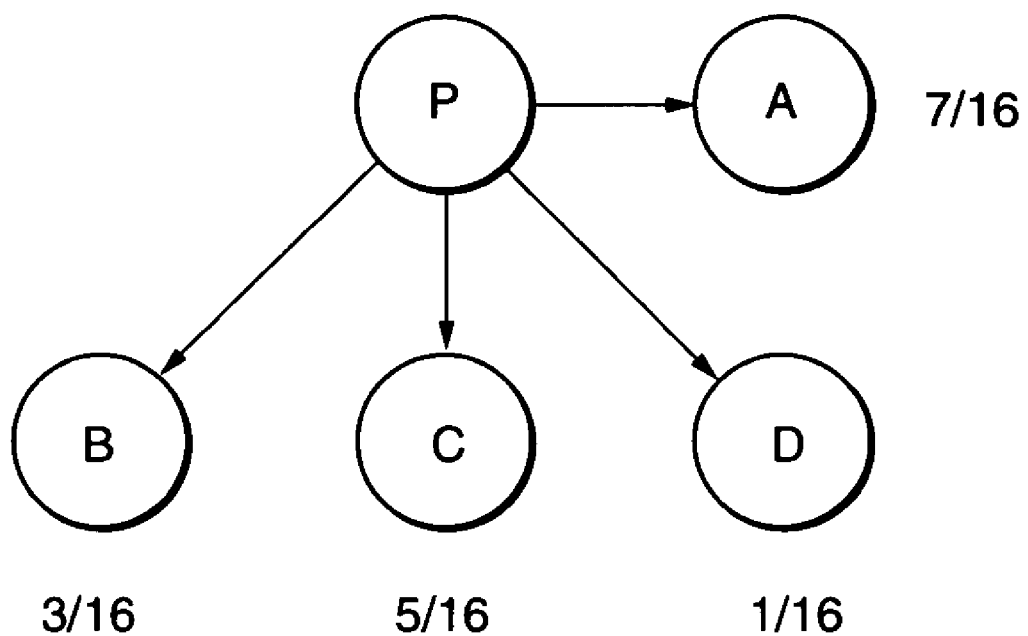
FIG. 1 illustrates multi-gradation processing with conventional error diffusion processing.
Figure 2:
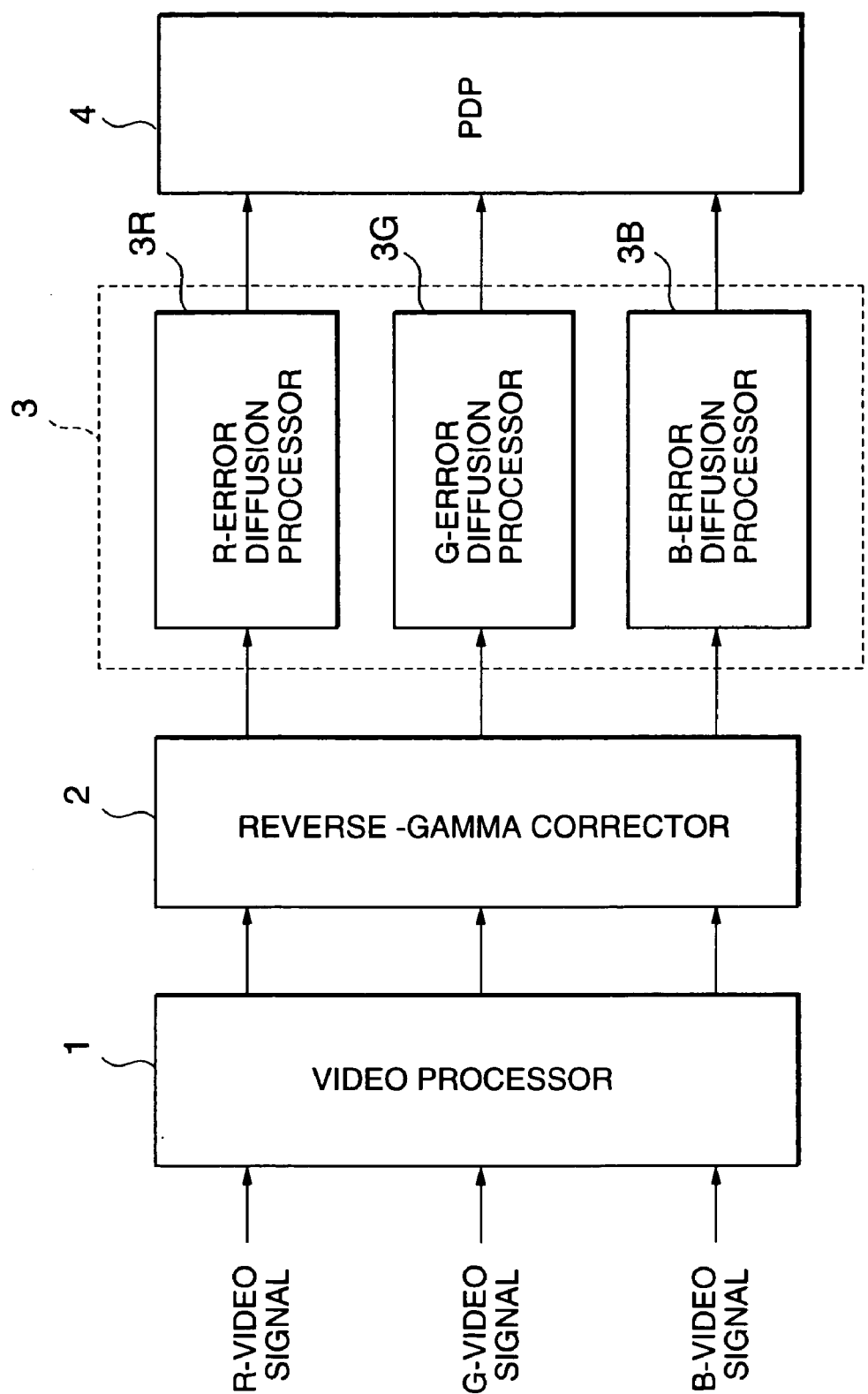
FIG. 2 shows a block diagram of the first preferred embodiment of an image displaying apparatus according to the present invention.

The first preferred embodiment shown in FIG. 2 relates to video signal processing according to the present invention. This embodiment uses a PDP as a matrix-type displaying device capable of displaying images only at a digitally-limited number of gradation levels. Not only a PDP, the present invention can use other types of image displaying apparatus, such as, those already introduced.

In FIG. 2, R-, G- and B-video signals are fed to a video signal processor 1. The processor 1 processes the video signals according to the video processing of the present invention which will be disclosed later and other types of video processing. The R-, G- and B-video signals in this embodiment are 8-bit digital signals, or video signals of 256 gradation levels. The R-, G- and B-video signals are termed as R-, G- and B-signals hereinafter for brevity.

The processed video signals are fed to a reverse-gamma corrector 2 for applying the reverse-gamma correction of the same characteristics to the signals. The corrector 2 in this embodiment outputs 12-bit digital signals, or video signals of 496 gradation levels, based on the input 8-bit digital signals to keep gradation levels which would otherwise be decreased due to the reverse-gamma correction.

The output R-, G-, and B-signals of the reverse-gamma corrector 2 are fed to R-, G- and B-error diffusion processors 3R, 3G and 3B, respectively. Each error diffusion processor in this embodiment processes the 12-bit digital signal so that the lower 4 bits of the 12 bits are diffused into the upper 8 bits of the 12 bits, to output a 8-bit digital signal.

The output 8-bit digital signal are fed to a PDP 4 for sub-filed processing to display R-, G- and B-signals on a screen.

Figure 3:
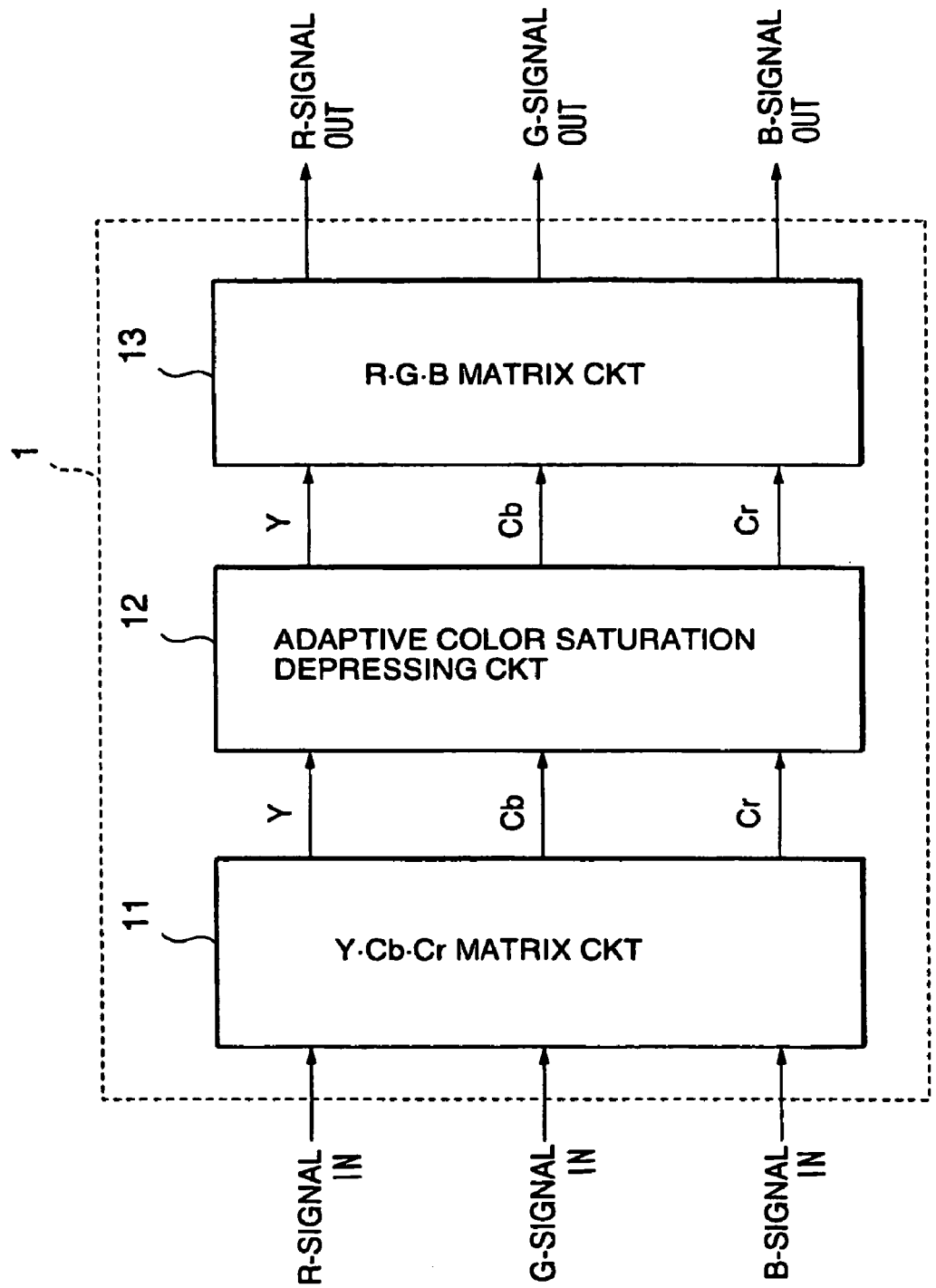
FIG. 3 shows a block diagram of a video signal processor installed in the first preferred embodiment of FIG. 2.
Figure 4:
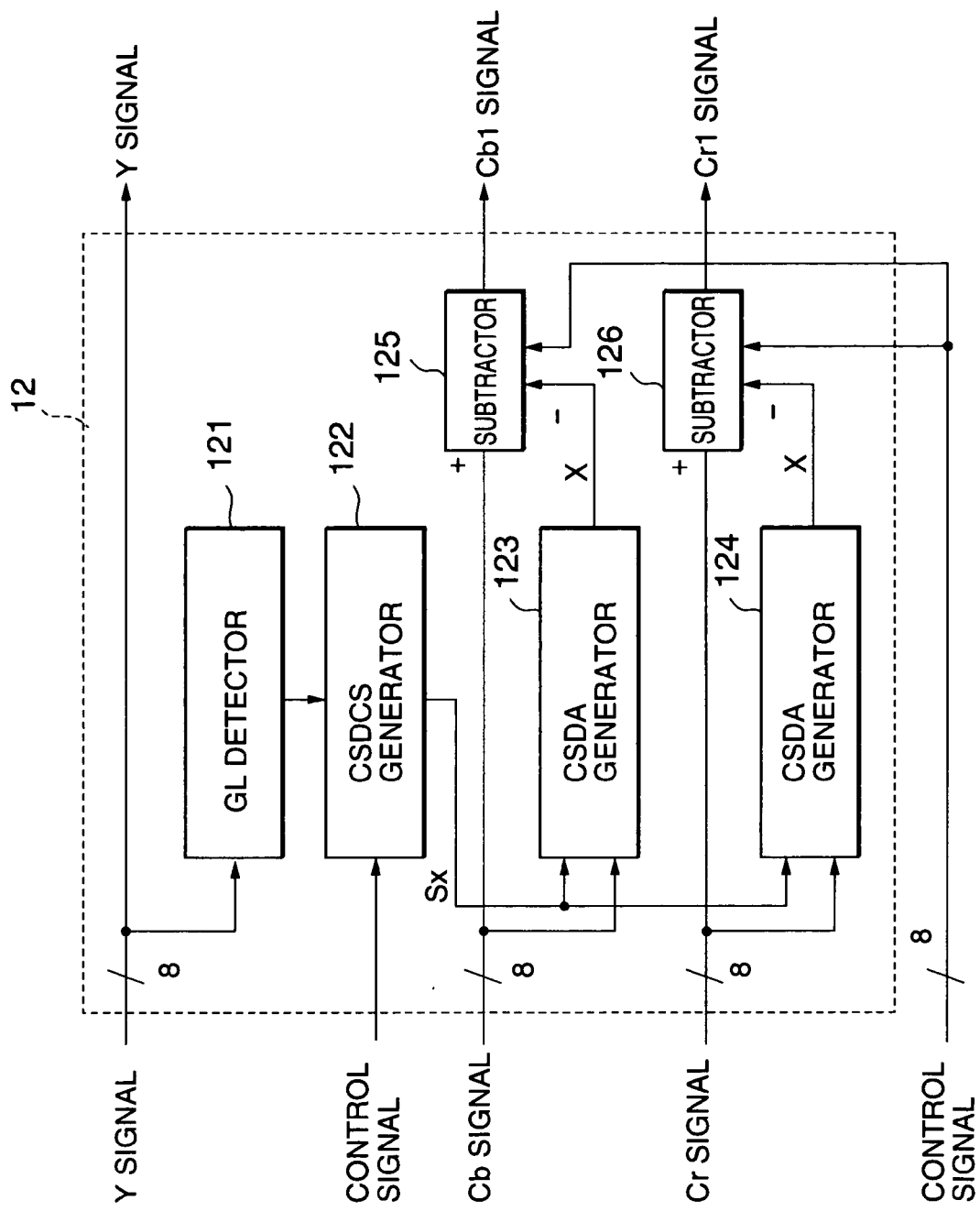
FIG. 4 shows a block diagram of an adaptive color saturation depressing circuit of the video signal processor shown in FIG. 3.

The video signal processor 1 will be disclosed in detail with reference to FIGS. 3 and 4.

R-, G- and B-signals are fed to a Y•Cb•Cr matrix circuit 11 for Y•Cb•Cr matrix conversion to output an intensity signal Y and color-difference signals Cb and Cr. The type of color-difference signals depends on the type of input video signals. When the input video signals are high-vision signals, these signals are fed to a Y•Pb•Pr matrix circuit for Y•Pb•Pr matrix conversion to output an intensity signal Y and color-difference signals Pb and Pr.

The intensity signal Y and color-difference signals Cb and Cr are fed to an adaptive color saturation depressing circuit 12 for depressing the color saturation (the values of the color-difference signals Cb and Cr) according to the intensity (the value of the intensity signal Y). The outputs of the adaptive color saturation depressing circuit 12 are fed to a R•G•B matrix circuit 13 for R•G•B matrix conversion to reproduce the input R-, G- and B-video signals.

The adaptive color saturation depressing circuit 12 will be disclosed in detail with reference to FIG. 4.

In FIG. 4, the intensity signal Y is fed to a gradation level (GL) detector 121, on the other hand the color-difference signals Cb and Cr are fed to a color saturation depression amount (CSDA) generators 123 and 124, respectively.

The intensity signal Y is delayed by a delay circuit (not shown for brevity) so that it is output at the same timing as for the Cb and Cr signals which are delayed due to the processing disclosed later.

A gradation level of the intensity signal Y is detected by the GL detector 121. The resultant detection signal is fed to a color saturation depression control signal (CSDCS) generator 122.

Figure 5:
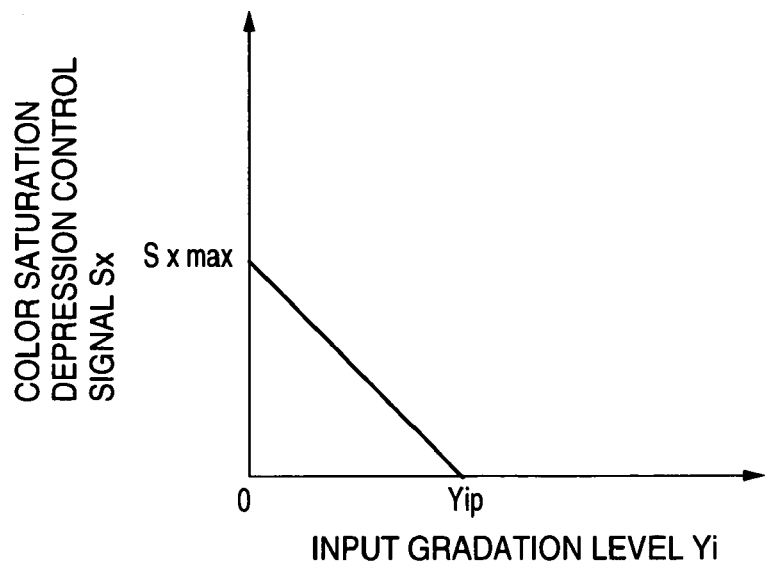
FIG. 5 illustrates the characteristics of color saturation depression control signal generated by the adaptive color saturation depressing circuit of FIG. 4.

As illustrated in FIG. 5, the CSDCS generator 122 generates a color saturation depression control signal Sx at a predetermined gradation level Yip (or less) that corresponds to an input gradation level Yi. The closer the gradation level from Yip to zero, the larger the control signal Sx. In this embodiment, the linear functions is shown in FIG. 5 for the relationship between the gradation level Yi and the color saturation depression control signal Sx. The control signal reaches the maximum value Sxmax at the gradation level zero. The linear function shown in FIG. 5 is not a must for the Yi-Sx relationship. It may, for example, be a curve exhibiting the relationship in that the smaller the gradation level Yi, the larger the control signal Sx. It is disclosed later, however, a control signal for controlling what level of a color saturation depression control signal Sx is output is supplied to the CSDCS generator 122, The output color saturation depression control signal Sx of the CSDCS generator 122 is fed to the CSDA generators 123 and 124 of the same circuitry. The CSDA generator 123 (124) generates a color saturation depression amount X by multiplying the input color-difference signal Cb (Cr) by a predetermined coefficient in response to the control signal Sx. Although not disclosed, such a color saturation depression amount can be generated without the input color-difference signal.

Figure 6:
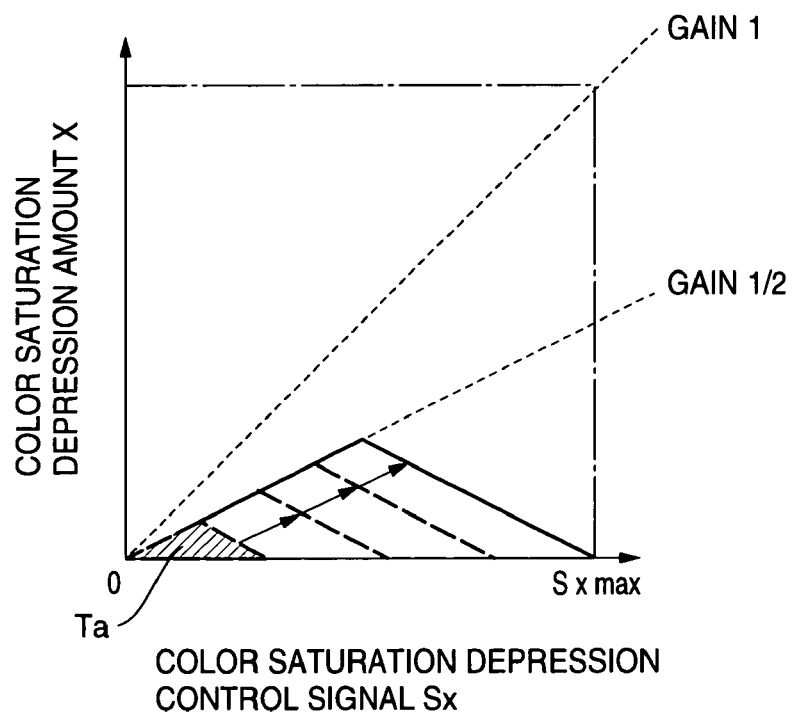
FIG. 6 illustrates the characteristics of color saturation depression amount generated by the adaptive color saturation depressing circuit of FIG. 4.

Generation of the color saturation depression level (amount X) by the CSDA generator 123 (124) in accordance with to the color-difference signal Cb (Cr) will be disclosed in detail with reference to FIG. 6.

The abscissa and the ordinate in FIG. 6 represent the color saturation depression control signal Sx and the color saturation depression amount X generated by the CSDA generator 123 (124), respectively.

As illustrated in FIG. 6, the CSDA generator 123 (124) generates a triangular shape color saturation depression amount X in accordance with the control signal Sx. In detail, a triangular shape color saturation depression amount X is decided within the region between the abscissa and a gain ½ (dotted line) of the CSDA generator 123 (124) to the color-difference signal Cb (Cr). The color saturation depression amount X is represented by the area of the triangle. The larger the control signal Sx, the larger the area of the triangle, as shown by the arrows. The gain of the CSDA generator 123 (124) to the color-difference signal Cb (Cr) is preferably ½, however, it may be 1 or less than ½.

Color saturation depression amounts X generated by the CSDA generator 123 and 124, and also the color-difference signal Cb and Cr are fed to subtractors 125 and 126, respectively.

The subtractor 125 (126) subtracts the color saturation depression amount X from the color-difference signal Cb (Cr) to output a color-difference signal Cb1 (Cr1).

The input color-difference signal Cb (Cr) is delayed by a delay circuit (not shown for brevity) so that it is fed to the subtractor 125 (126) at the same timing as for the color saturation depression amount X generated by the CSDA generator 123 (124) to which the signal Cb (Cr) is input with no delay.

The subtraction performed by the subtractors 125 and 126 is controlled by a control signal fed thereto, which will be described later.

Figure 7:
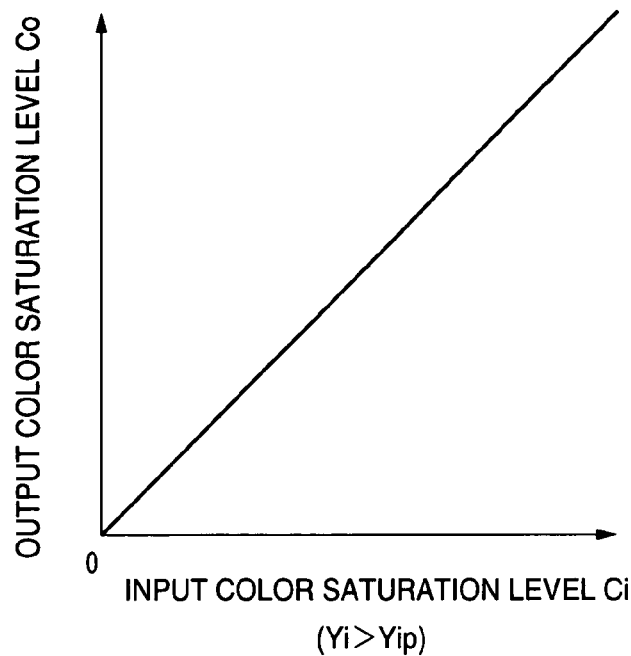
FIG. 7 illustrates one type of the characteristics of color saturation depression processing according to the first embodiment.

The operation of the adaptive color saturation depressing circuit 12 as disclosed above is summarized as follows:

When an input gradation level Yi is higher a predetermined level Yip (Yi>Yip), an input color saturation level Ci of the color-difference signal Cb (Cr) is output with no change as a color saturation level Co (=Ci) by the adaptive color saturation depressing circuit 12. Since the color saturation depression amount X is zero in this case, the relationship between the input gradation levels Yi and the color saturation level Co (Yi>Yip) is represented as shown in FIG. 7. The predetermined level Yip is, for example, 64 for 256 gradation levels.

On the other hand, when an input gradation level Yi is equal to or lower than the predetermined level Yip (Yi≦Yip), the CSDCS generator 122 generates the output color saturation depression control signal Sx based on the input gradation level Yi, as explained with reference to FIG. 5, and the CSDA generator 123 and 124 generate the color saturation depression amounts X in response to the control signal Sx.

Figure 8:
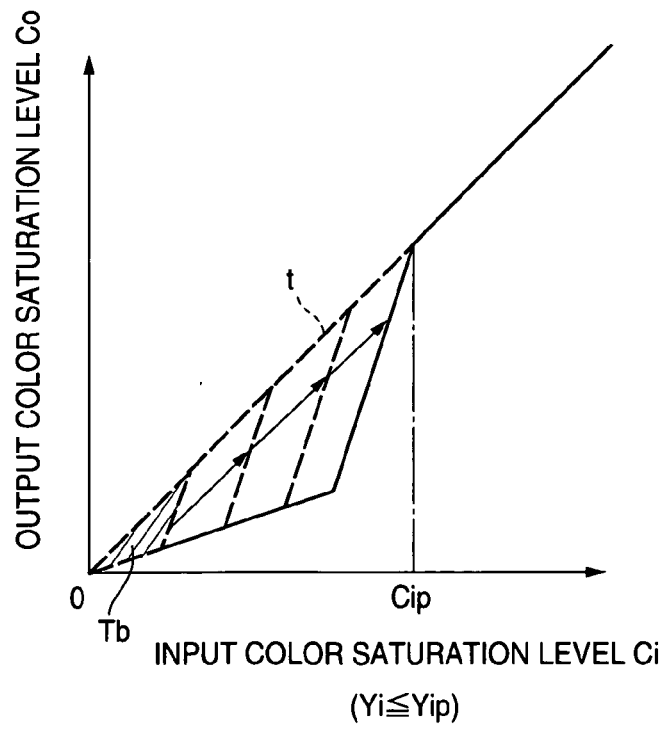
FIG. 8 illustrates another type of the characteristics of color saturation depression processing according to the first embodiment.

The depression amounts X are subtracted from the input color-difference signals Cb and Cr by the subtrators 125 and 126, respectively, thus providing the relationship between input and output color saturation levels Ci and Co, as shown in FIG. 8.

Increase in color saturation depression amount X as illustrated in FIG. 6 causes the change in the relationship between input and output levels Ci and Co, as represented by the arrows shown in FIG. 8.

The dotted-straight line "t" shown in FIG. 8 represents the characteristics when the color saturation depression amount X is zero. Subtraction of the depression amount X as illustrated in FIG. 6 produces the Ci-Co characteristics that drops under the straight line "t" as illustrated in FIG. 8. The area of the triangle Ta depicted by oblique lines in FIG. 6 is equal to the triangle Tb (which is subtracted under the straight line "t") depicted by oblique lines in FIG. 8. As illustrated in FIG. 8, increase in color saturation depression amount X from the triangle Tb toward the arrows causes gradual enlargement of the triangle to be subtracted for the Ci-Co characteristics.

As disclosed above, the operation with reference to FIGS. 5 to 8 is an adaptive control of depression amount of the input color saturation level Ci so that the input color saturation level Ci is decreased from the level zero (achromatic color side) to more by increasing the color saturation depression amount X as the input gradation level Yi approaches zero. This operation is performed when the input color saturation level Ci is equal to or lower than the predetermined color saturation level Cip in the low gradation range where the input gradation level Yi is equal to or lower than the predetermined gradation Yip.

Accordingly, the present invention achieves restriction of edge-like image disturbances generated on dark images in vicinity of black, thus preventing generation of images of color saturation as if bits have been dropped.

Furthermore, the present invention achieves restriction of generation of periodical color pattern noises due to multi-gradation processing and of decrease in color saturation of images with a large color saturation in low intensity range, thus offering sharp color reproduction even for dark images.

The operation illustrated in FIG. 8 decreases the output color saturation level Co but higher than the zero level when the input color saturation level Ci is equal to or lower than the predetermined level Cip.

Figure 9:
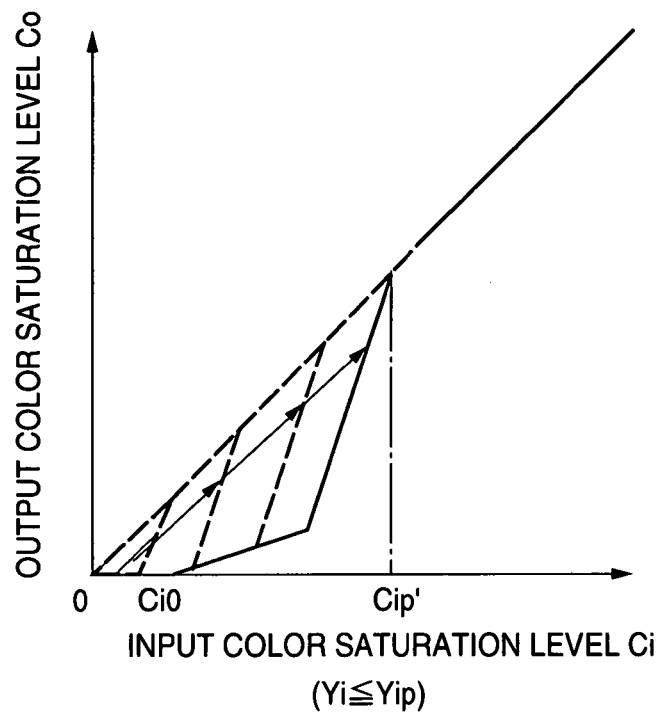
FIG. 9 illustrates still another type of the characteristics of color saturation depression processing according to the first embodiment.

For depression of color saturation mainly in the achromatic color side, however, as illustrated in FIG. 9, the starting point of subtraction of the color saturation depression amount X can be shifted in the direction of low color saturation so that the output color saturation level is zero when the input color saturation level Ci is equal to or lower than a level Cio. The maximum input color saturation level from which the level Ci is decreased is the level Cip' as shown in FIG. 9, to which the level is shifted from the color saturation level Cip in the direction of low color saturation level.

The foregoing operation is performed in the low gradation range lower than the gradation level Yip. The present invention, however, can be applied to the intermediate and high gradation ranges. For example, for PDPs, a gradation level range to be subjected to color saturation depression can be set for a gradation range in which luminance intensity exhibits a big difference between adjacent gradation levels, according to selection of sub-fields. Moreover, color saturation range can be achromatic color range, and intermediate and high color saturation ranges for which color saturation is mainly depressed.

Figure 10:
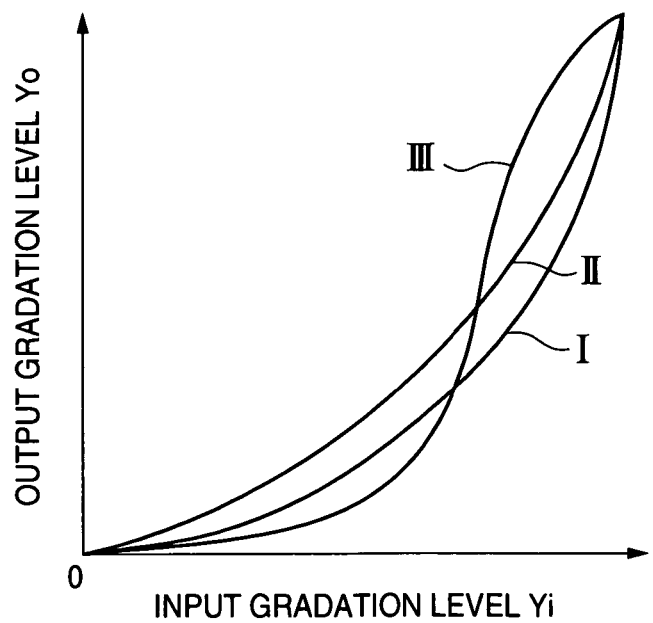
FIG. 10 illustrates reverse-gamma correction characteristics curves according to the first embodiment.

The curves I, II and III illustrated in FIG. 10 are reverse-gamma correction characteristics to be applied to the reverse-gamma corrector 2 shown in FIG. 2. These characteristics curves can be switched according to the input video signal.

The input gradation level Yi (abscissa) in FIG. 10 represents the input gradation level to the reverse-gamma corrector 2. The output gradation level Yo (ordinate) in FIG. 10 represents the output gradation level from the reverse-gamma corrector 2.

Switching the reverse-gamma correction characteristics among the curves I, II and III would cause generation of edge-like image disturbances or production of images of color saturation in which bits have been dropped. These can be avoided by setting the gradation level range to be subjected to color saturation depression at intermediate or high gradation level range and the color saturation range to be subjected to color saturation depression at low, intermediate or high color saturation range.

Figure 11:
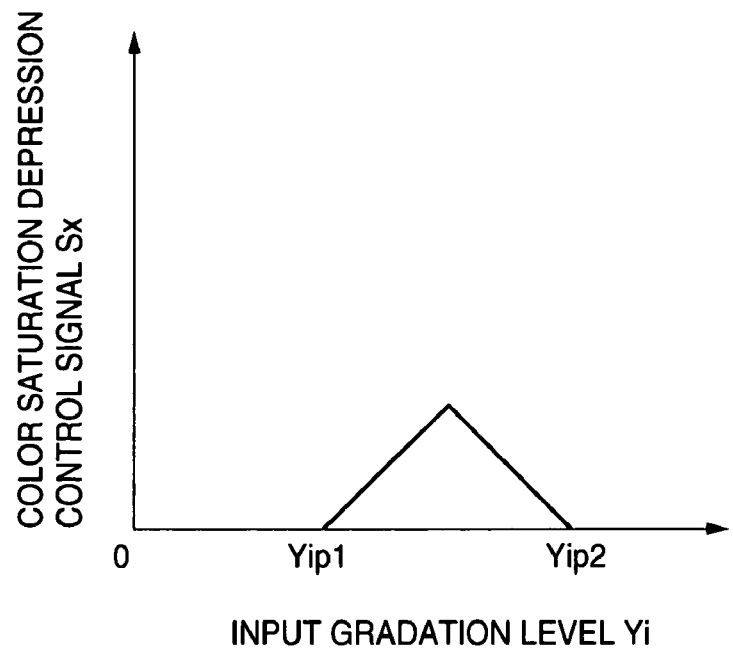
FIG. 11 illustrates another type of the characteristics of color saturation depression control signal generated by the adaptive color saturation depressing circuit of FIG. 4.

Illustrated in FIG. 11 is color saturation depression in the intermediate gradation level range. The CSDCS generator 122 (FIG. 4) generates a triangular color saturation depression control signal Sx in the intermediate gradation level range from an input gradation level YiP1 to another input gradation level YiP2. The CSDA generator 123 (124) generates a color saturation depression amount X in response to the control signal Sx. The subtrator 125 (126) subtracts the amount X from the color-difference signal Cb (Cr) in the low, intermediate or high color saturation range for color saturation depression.

The control signal fed to the CSDCS generator 122 is used to switch the generation of color saturation depression control signal Sx among the low gradation level range equal to or lower than the gradation level YiP as shown in FIG. 5, the intermediate gradation level range from the gradation levels YiP1 to YiP2 as shown in FIG. 11, and the high gradation level range (which is not shown). The characteristics of the color saturation depression control signal Sx can also be switched by the control signal fed to the CSDCS generator 122.

Figure 12:
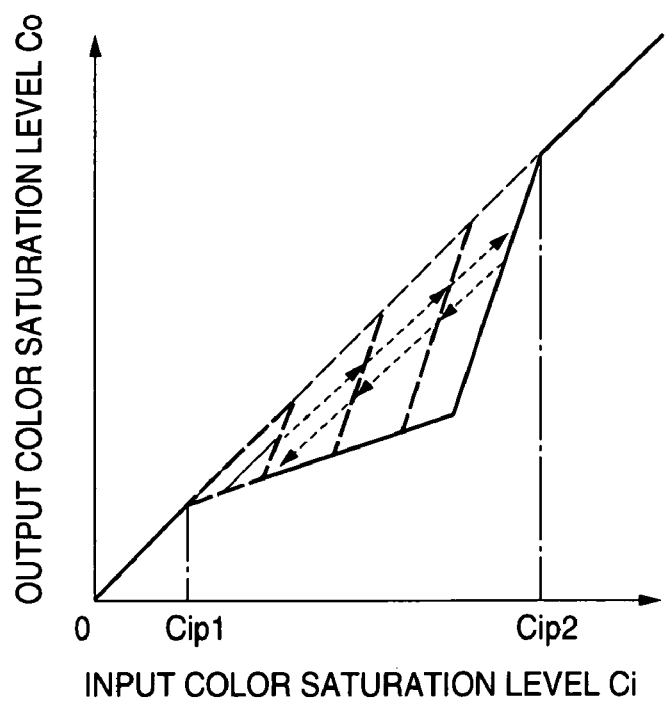
FIG. 12 illustrates still another type of the characteristics of color saturation depression processing according to the first embodiment.

Illustrated in FIG. 12 is color saturation depression in the intermediate color saturation range. The CSDCS generator 122 generates a color saturation depression control signal Sx in the low gradation level range equal to or lower than the gradation level YiP shown in FIG. 5, the intermediate gradation level range from the gradation levels YiP1 to YiP2 shown in FIG. 11 or the high gradation level range (not shown).

The CSDA generator 123 (124) generates a color saturation depression amount X in response to the control signal Sx. The subtrator 125 (126) subtracts the amount X from the color-difference signal Cb (Cr) in the intermediate color saturation range from an input color saturation level CiP1 to another input color saturation level CiP2, as shown in FIG. 12, for color saturation depression.

The control signal fed to the subtractors 125 and 126 is used to switch the generation of color saturation depression amount X among the low color saturation range (FIG. 8), the intermediate color saturation range (FIG. 12) and the high color saturation range (not shown). This control signal can also be used for switching of how color saturation is depressed in each of the low, intermediate and high color saturation ranges. Color saturation depression in the intermediate and high color saturation ranges requires color saturation depression amount X-updating by the CSDA generators 123 and 124, and/or the subtrators 125 and 126.

Moreover, color saturation depression can be performed from the input color saturation level CiP2 at the highest color saturation level in the intermediate color saturation level range, as shown by dotted arrow in FIG. 12. The number of bits of the control signal fed to the subtractors 125 and 126 is the same as for the input color-difference signals Cb and Cr, which is eight bits in FIG. 4.

As disclosed above, a gradation level range for color saturation depression and a color saturation depression level range for actual color saturation depression can be set according to a region of image or image them-selves to which image disturbances would occur due to the display characteristics of a displaying apparatus or the reverse-gamma correction characteristics.

In detail, as shown in FIGS. 5 to 8, the following combinations are applicable:

To depress the color saturation in the low color saturation range in the low gradation range;

To depress the color saturation in the intermediate color saturation range in the low gradation range;

To depress the color saturation in the high color saturation range in the low gradation range;

To depress the color saturation in the low color saturation range in the intermediate gradation range;

To depress the color saturation in the intermediate color saturation range in the intermediate gradation range;

To depress the color saturation in the high color saturation range in the intermediate gradation range;

To depress the color saturation in the low color saturation range in the high gradation range;

To depress the color saturation in the intermediate color saturation range in the high gradation range; and To depress the color saturation in the high color saturation range in the high gradation range.

The low gradation range is a range from the gradation level zero to any intermediate level that is a level close to the level zero and distant from the maximum level. The intermediate gradation range is a range from a first any intermediate gradation level distant from the level zero to a second any intermediate gradation level. The intermediate gradation range is not limited to a central gradation range. The high gradation range is a range from any intermediate gradation level distant from the gradation level zero to the maximum gradation level. This intermediate gradation level is distant from the level zero and close to the maximum level.

The low color saturation range is a range from the color saturation level zero to any intermediate level that is a level close to the level zero and distant from the maximum level. The intermediate color saturation range is a range from a first any intermediate color saturation level distant from the level zero to a second any intermediate color saturation level. The intermediate color saturation range is not limited to a central color saturation range. The high color saturation range is a range from any intermediate color saturation level distant from the color saturation level zero to the maximum color saturation level. This intermediate color saturation level is distant from the level zero and close to the maximum level.

Adaptive color saturation depression is preferably performed, as depicted by the solid line-arrows in FIG. 8, from the lower input color saturation Ci side, or the achromatic color (color saturation zero) side, and also, as depicted by the solid line-arrows in FIG. 12, from the input color saturation Cip1 side.

However, as disclosed above, the color saturation depression level can be set according to a region of image or image them-selves to which image disturbances would occur due to the display characteristics of a displaying apparatus or the reverse-gamma correction characteristics.

As disclosed above, the video signal processing according to the present invention achieves image quality enhancement for dark portions, and intermediate or high gradation range of images displayed by displaying apparatus that can only express digitally-limited intermediate gradation by regaining the linear gradation characteristics of input video signals with the reverse-gamma correction. Not only to such displaying apparatus, however, the present invention is applicable to other displaying apparatus, such as, CRTs used as monitors for VTRs or personal computers, and projection-type displaying apparatus, etc.

As disclosed above, the video signal processing according to the first embodiment achieves preferable color reproduction with no color quasi edge-like image disturbances in a specific gradation range such as the low gradation range, images of color saturation as if bits have been dropped or color pattern noises by detecting a gradation level of an input video signal to adaptively depress the color saturation level in a color saturation range having a predetermined color saturation level of the input video signal only in a gradation range having a predetermined gradation level.

The Second Preferred Embodiment

The second embodiment relates to error diffusion processing. The overall circuit configuration of a displaying apparatus used for the second embodiment is like shown in FIG. 2 for the first embodiment.

Elements in this embodiments and also those in the third to the fifth embodiments which will be described later, that are the same or analogous to the elements in the first embodiment are referenced by the same reference numbers and will not be explained in detail.

The difference between the first and second embodiments is that the latter uses three error diffusion coefficients one of which is different from the other two or all of which are different from each other for R-, G- and B-error diffusion processors.

Figure 13:
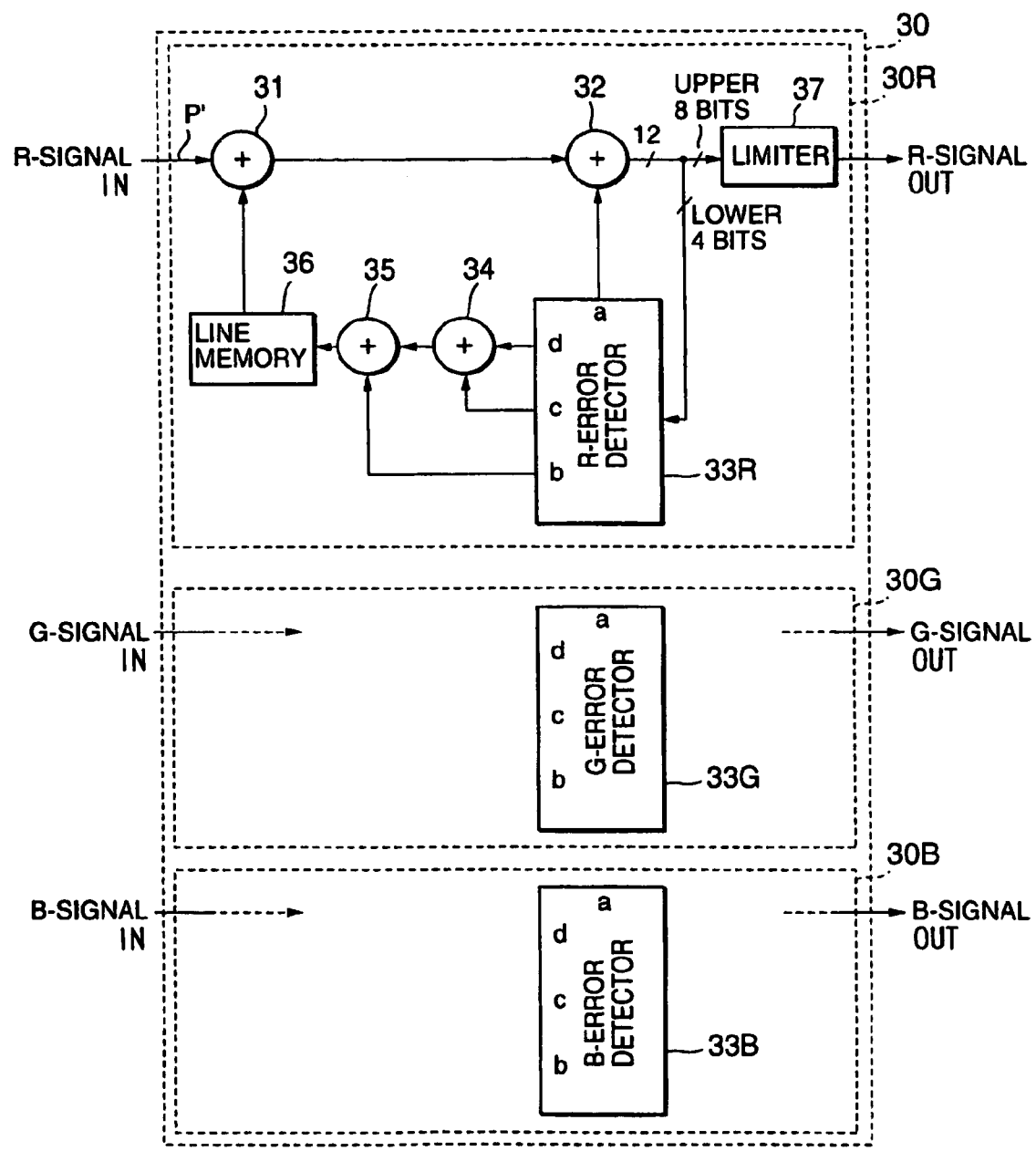
FIG. 13 shows a block diagram of an error diffusion processor for the second preferred embodiment of an image displaying apparatus according to the present invention.

As shown in FIG. 13, an R-error diffusion processor 30R, a G-error diffusion processor 30G, and a B-error diffusion processor 30B for the second embodiment have the same circuitry, the block diagrams for the processors 30G and 30B being omitted for brevity.

Error diffusion coefficients set in these processors are different from each other. However, since the operation is the same, the following disclosure is only for the R-error diffusion processor 30R, for brevity.

In FIG. 13, a 12-bit R-signal fed by the reverse-gamma corrector 2 (FIG. 2) is output via adders 31 and 32. The lower 4 bits of the 12-bit data output by the adder 32 are fed to a R-error detector 33R. The lower 4 bits correspond to the gradation difference that will be lost by converting the 12-bit digital signal (4096 gradations) to the 8-bit digital signal (256 gradations).

Figure 14A:
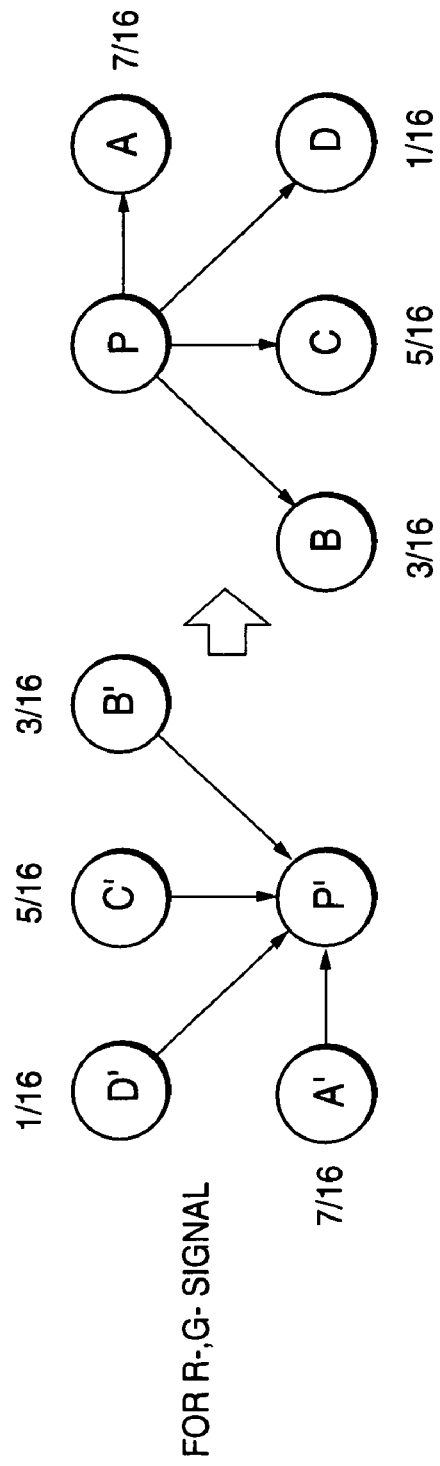
FIGS. 14A and 14B illustrate error diffusion processing in the second preferred embodiment.

The R-error detector 33R generates error data by multiplying the input lower 4-bit data by error diffusion coefficients, according to dots A', B', C' and D' that surround a dot P', as shown in FIG. 14A.

In detail, the R-error detector 33R generates error data via its terminals "a", "b", "c" and "d", by multiplying the lower 4-bit data by the error diffusion coefficients 7/16, 3/16, 5/16 and 1/16, respectively. The relationship between the dots A', B', C' and D' and the corresponding dots A, B, C and D in FIG. 14A will be disclosed later.

The error data output via the terminals "a", "b", and "c" and "d" are fed to the adder 32, an adder 35, and an adder 34, respectively. The adder 34 adds the error data from the terminals "d" and "c". The output of the adder 34 is fed to the adder 35 and added to the error data from the terminal "b". The addition result is fed to a line memory 36 by which the output of the adder 35 is delayed by a period slightly shorter than a period for one line and fed to the adder 31.

The output of the line memory 36 and the input R-signal are added by the adder 31 and fed to the adder 32. The input R-signal corresponds to the dot P' in FIG. 14A in this embodiment. The adder 31 performs addition of the output of the line memory 36 that is the error data generated one line ago to the to the dot P', or B'×3/16+C'×5/16+D'×1/16.

The output of the adder 31 is added by the adder 32 to the error data output by the R-error detector 33R via the terminals "a". The adder 32 performs addition of the output of the adder 31 and the error data A'×7/16 generated by the R-error detector 33R one dot ago.

As disclosed, error data generated by multiplying the dots A', B', C' and D' by their respective error diffusion coefficients are added to the dot P' in FIG. 14A. The next lower 4 bits of the output 12-bit data of the adder 32 are fed to the R-error detector 33R for repetition of the same processing described above.

On the other hand, the upper 8 bits of the output 12-bit data of the adder 32 are fed to a limiter 37 for limiting an overflow data portion of the data obtained by error data addition to the dot P' that exceeds the 8 bits, to output a R-signal.

The error data addition to the dot P' per dot (A', B', C' and D') as described above means diffusion of the lower 4-bit data of the dot P toward the surrounding dots A, B, C and D by multiplying the lower 4-bit data by the error diffusion coefficients 7/16, 3/16, 5/16 and 1/16, as shown in FIG. 14A.

In the second embodiment shown in FIG. 13, the error diffusion coefficient for a G-error detector 33G of the G-error diffusion processor 30G is set at the same value for the R-error detector 33R of the R-error diffusion processor 30R, however, the error diffusion coefficient for a B-error detector 33B of the B-error diffusion processor 30B is set at a value different from that for the detectors 33R and 33G.

Figure 14B:
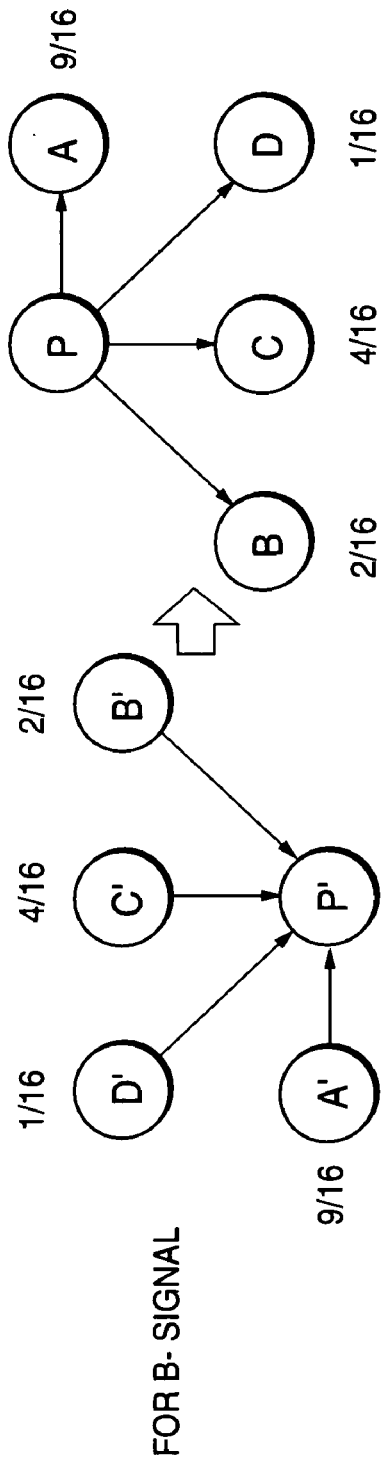

As shown in FIG. 14B, the lower 4-bit data of the dot P for the B-signal is diffused toward the surrounding dots A, B, C and D by multiplying the lower 4 bit-data by the error diffusion coefficients 9/16, 2/16, 4/16 and 1/16.

As disclosed above, the R-, G- and B-error diffusion processors 30R, 30G and 30B perform error diffusion to the R-, G- and B-signals by using three error diffusion coefficients one of which is different from the other or all of which are different from each other for the three signals composing a dot, to output a 12-bit data as an 8-bit data. All of or some the error diffusion coefficients to the surrounding dots A, B, C and D may be different from each other.

In FIGS. 14A and 14B, the same error coefficient 1/16 is applied to the dot D, on the other hand, those for the dots A, B and C are different from each other. Difference in error coefficient is preferably small rather than large.

As disclosed above, the second embodiment achieves displaying of images corresponding to 12 bits by the PDP 4 (FIG. 2) capable of 8-bit displaying with visual integration.

Moreover, the second embodiment achieves image displaying at a high quality with less image disturbances like periodical pattern noises peculiar to error diffusion even for displaying fixed pattern images by using error diffusion coefficients at least one of which is different from the other to the R-, G- and B-signals.

The Third Preferred Embodiment

The third embodiment relates to error diffusion processing. The overall circuit configuration of a displaying apparatus used for the third embodiment is like shown in FIG. 2 for the first embodiment.

The difference between the first and third embodiments is that the latter uses three error diffusion coefficients at least one of which is different from the other in the number of bits used for error diffusion.

For example, only for a B-signal, the total three bits from the lower fourth bit to the lower second bit of a 12-bit digital signal are diffused to the upper 8 bits, to output an 8-bit digital signal.

The feature of the third embodiment lies in that the number of bits used for error diffusion to either of input R-, G- and B-signals, or the number of bits to be diffused to the upper 8-bits for error diffusion to either of the input signals is different from the other or all of the bits for error diffusion to the three input signals are different from each other.

The circuit configuration for the third embodiment is the same as shown in FIG. 13 for the second embodiment; hence the operation of the third embodiment will be described with reference to FIG. 13.

In FIG. 13, a 12-bit R-signal fed by the reverse-gamma corrector 2 (FIG. 2) is output via the adders 31 and 32. The lower 4 bits of the 12-bit data output by the adder 32 are fed to the R-error detector 33R. The lower 4 bits correspond to gradation difference that will be lost by converting the 12-bit digital signal (4096 gradations) to an 8-bit digital signal (256 gradations).

Figure 15A:
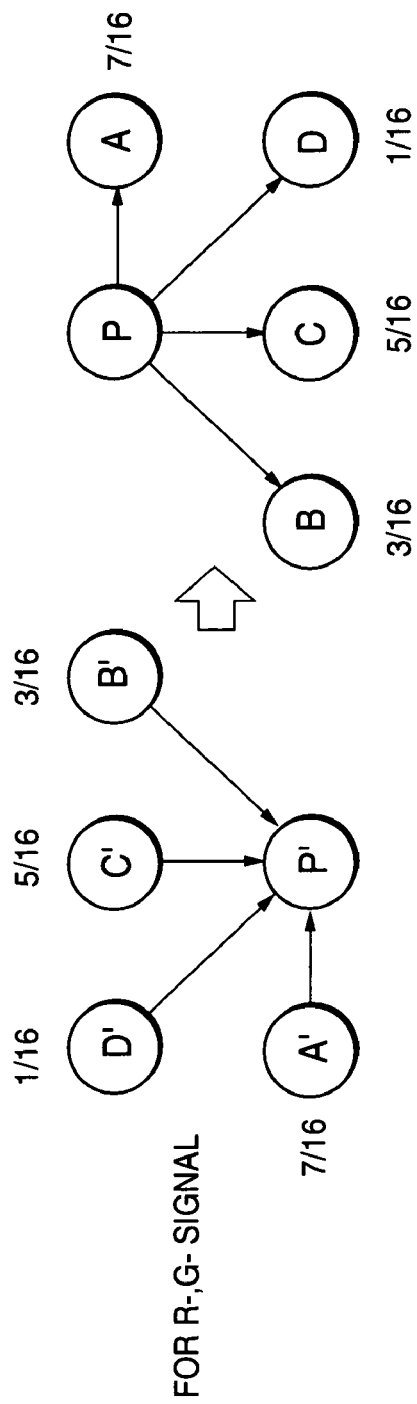
FIGS. 15A and 15B illustrate error diffusion processing in the third preferred embodiment of an mage displaying apparatus according to the present invention.

The R-error detector 33R generates error data by multiplying the input lower 4-bit data by error diffusion coefficients, according to dots A', B', C' and D' that surround a dot P', as shown in FIG. 15A.

In detail, the R-error detector 33R generates error data via its terminals "a", "b", "c" and "d", by multiplying the lower 4-bit data by the error diffusion coefficients 7/16, 3/16, 5/16 and 1/16, respectively.

The error data output via the terminals "a", "b", and "c" and "d" are fed to the adder 32, the adder 35, and the adder 34, respectively. The adder 34 adds the error data from the terminals "c" and "d". The output of the adder 34 is fed to the adder 35 and added to the error data from the terminal "b". The addition result is fed to the line memory 36 by which the output of the adder 35 is delayed by a period slightly shorter than a period for one line and fed to the adder 31.

The output of the line memory 36 and the input R-signal are added by the adder 31 and fed to the adder 32. The input R-signal corresponds to the dot P' in FIG. 15A in this embodiment. The adder 31 performs addition of the output of the line memory 36 that is the error data generated one line ago to the to the dot P', or B'×3/16+C'×5/16+D'×1/16.

The output of the adder 31 is added by the adder 32 to the error data output by the R-error detector 33R via the terminals "a". The adder 32 performs addition of the output of the adder 31 and the error data A'×7/16 generated by the error detector 33R one dot ago.

As disclosed, error data generated by multiplying the dots A', B', C' and D' by their respective error diffusion coefficients are added to the dot P' in FIG. 15A. The next lower 4 bits of the output 12-bit data of the adder 32 are fed to the R-error detector 33R for repetition of the same processing described above.

On the other hand, the upper 8 bits of the output 12-bit data of the adder 32 are fed to the limiter 37 for limiting an overflow data portion of the data obtained by error data addition to the dot P1 that exceeds the 8 bits, to output an R-signal.

The error data addition to the dot P' per dot (A', B', C' and D') as described above means diffusion of the lower 4-bit data of the dot P toward the surrounding dots A, B, C and D by multiplying the lower 4 bit-data by the error diffusion coefficients 7/16, 3/16, 5/16 and 1/16, as shown in FIG. 15A.

In the third embodiment shown in FIG. 13, the number of bits of the error diffusion coefficient for the G-error detector 33G of the G-error diffusion processor 30G is set at the same value for the R-error detector 33R of the R-error diffusion processor 30R, however, the number of bits of the error diffusion coefficient for the B-error detector 33B of the B-error diffusion processor 30B is set at a value different from that for the detectors 33R and 33G.

Figure 15B:
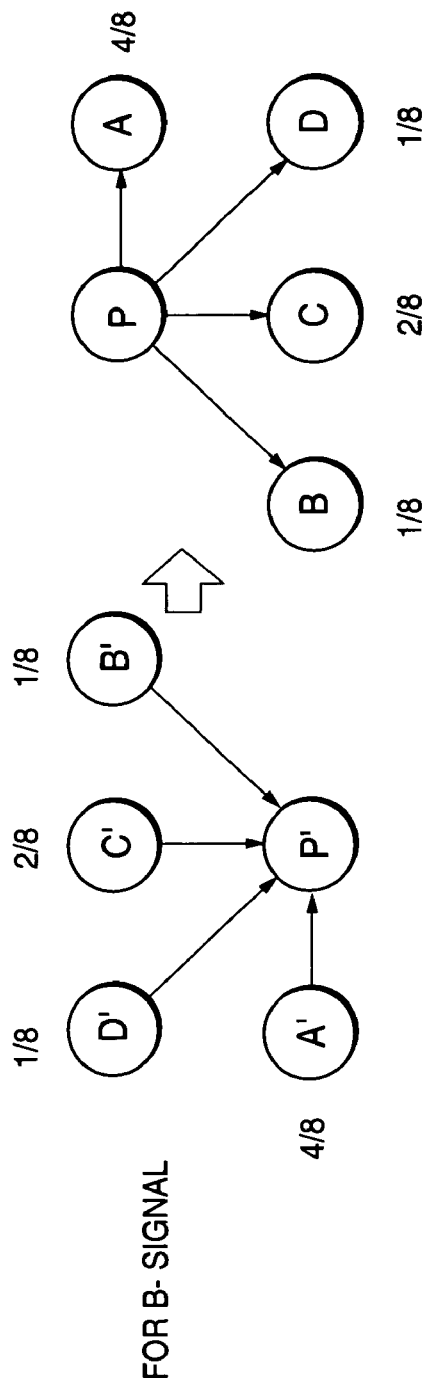

As shown in FIG. 15B, 3-bit data from the lower fourth bit to the lower second bit of the dot P for the B-signal is diffused toward the surrounding dots A, B, C and D by multiplying the 3-bit data by error diffusion coefficients 4/8, 1/8, 2/8 and 1/8.

The third embodiment performs error diffusion by using the three bits from the lower fourth bit to the lower second bit of the 12-bit B-signal.

However, not only this, error diffusion can be performed by outputting the 12-bit B-signal as an 11-bit B-signal, or a 2048-gradation signal, from the reverse-ganma corrector 2 (FIG. 2) with the same reverse-gamma correction characteristics for the R- and G-signals, and multiplying the above error coefficients to the lower 3-bit data of the 11-bit B-signal for diffusion toward the surrounding dots A to D.

This error diffusion offers less ROM-capacity for reverse-gamma correction of a B-signal by a look-up table (LUT) using a read-only memory (ROM). Moreover, for one-bit reverse-gamma correction, this error diffusion offers only 3-bit circuitry for the B-error diffusion processor 3B, and also offers a 1-bit less line memory (36) for one-line delay.

As disclosed above, in the third embodiment, the R-, G- and B-error diffusion processors 30R, 30G and 30B perform error diffusion to the R-, G- and B-signals by using error diffusion coefficients the number of bits of one of which is different from the other or the number of bits of all of which are different from each other for the three signals composing a dot, to output a 12-bit data (11-bit data for the B-signal) as an 8-bit data. All or some of the error diffusion coefficients to the surrounding dots A, B, C and C may be different from each other.

Difference in the number of bits of the error coefficient is preferably small rather than large.

As disclosed above, the third embodiment achieves displaying of images corresponding to 12 bits (11 bits for the B-signal) by the PDP 4 (FIG. 2) capable of 8-bit displaying with visual integration.

Moreover, the third embodiment achieves image displaying at a high quality with less image disturbances like periodical pattern noises peculiar to error diffusion even for displaying fixed pattern images by using error diffusion coefficients composed of different number of bits to the R-, G- and B-signals.

In the third embodiment, the number of bits of the error diffusion coefficient for the B-signal is 3 bits, while that for the R- and G-signals is 4 bits. Such a number of bits is, however, not a must.

This invention can use some of the lower bits (not all the lower bits) of a first number of bits, that is the difference between the first number of bits and a second number of bits, for error diffusion. The some of the lower bits are preferably from the most significant bit of the lower bits (the lower fourth bit in the third embodiment) to the continuous upper bits.

Moreover, the third embodiment uses 4 bits as the number of bits of the error diffusion to the R- and G-signals and the same error diffusion coefficient to the surrounding dots.

Different diffusion coefficients can, however, be applied to the surrounding dots. One example is illustrated in FIGS. 16A, 16B and 16C. In detail, for the B-signal, the lower 4-bit data of the dot P is multiplied by 7/16, 3/16, 5/16 and 1/16 for error diffusion to the surrounding dots A to D, as shown in FIG. 16A; for the G-signal, the lower 4-bit data of the dot P is multiplied by 9/16, 2/16, 4/16 and 1/16 for error diffusion to the surrounding dots A to D, as shown in FIG. 16B; and for the B-signal, the 3-bit data from the lower fourth bit to the lower second bit (or the lower 3-bit data for 11-bit reverse-gamma correction) of the dot P is multiplied by 4/8, 1/8, 2/8 and 1/8 for error diffusion to the surrounding dots A to D, as shown in FIG. 16C.

As disclosed, in the third embodiment, the R-, G- and B-error diffusion processors 30R, 30G and 30B perform error diffusion to the R-, G- and B-signals by using error diffusion coefficients the number of bits of one of which is different from the other or the number of bits of all of which are different from each other for the three signals composing a dot, to output a 12-bit or an 11-bit data as an 8-bit data.

For the surrounding dots A to D, all or some of the error diffusion coefficients can be different from each other. FIGS. 16A and 16B use the same error diffusion coefficient 1/16 to the surrounding dot D, while different diffusion coefficients to the surrounding dots A to C. The difference in diffusion coefficient is preferably small rather than large.

As disclosed, the third embodiment achieves less image disturbances like periodical pattern noises peculiar to error diffusion even for displaying fixed pattern images by using error diffusion coefficients, the number of bits thereof for at least one of the R-, G- and B-signals is different from the other. The third embodiment also achieves circuitry-saving for the reverse-gamma correction and error diffusion processing.

The Fourth preferred Embodiment

The fourth embodiment relates to a displaying apparatus having a reverse-gamma corrector and an error diffusion processor. This embodiment also uses a PDP as a matrix-type displaying device capable of displaying images only at a digitally-limited number of gradation levels. Not only a PDP, the present invention can use other types of image displaying apparatus, such as, those already introduced.

Figure 17:
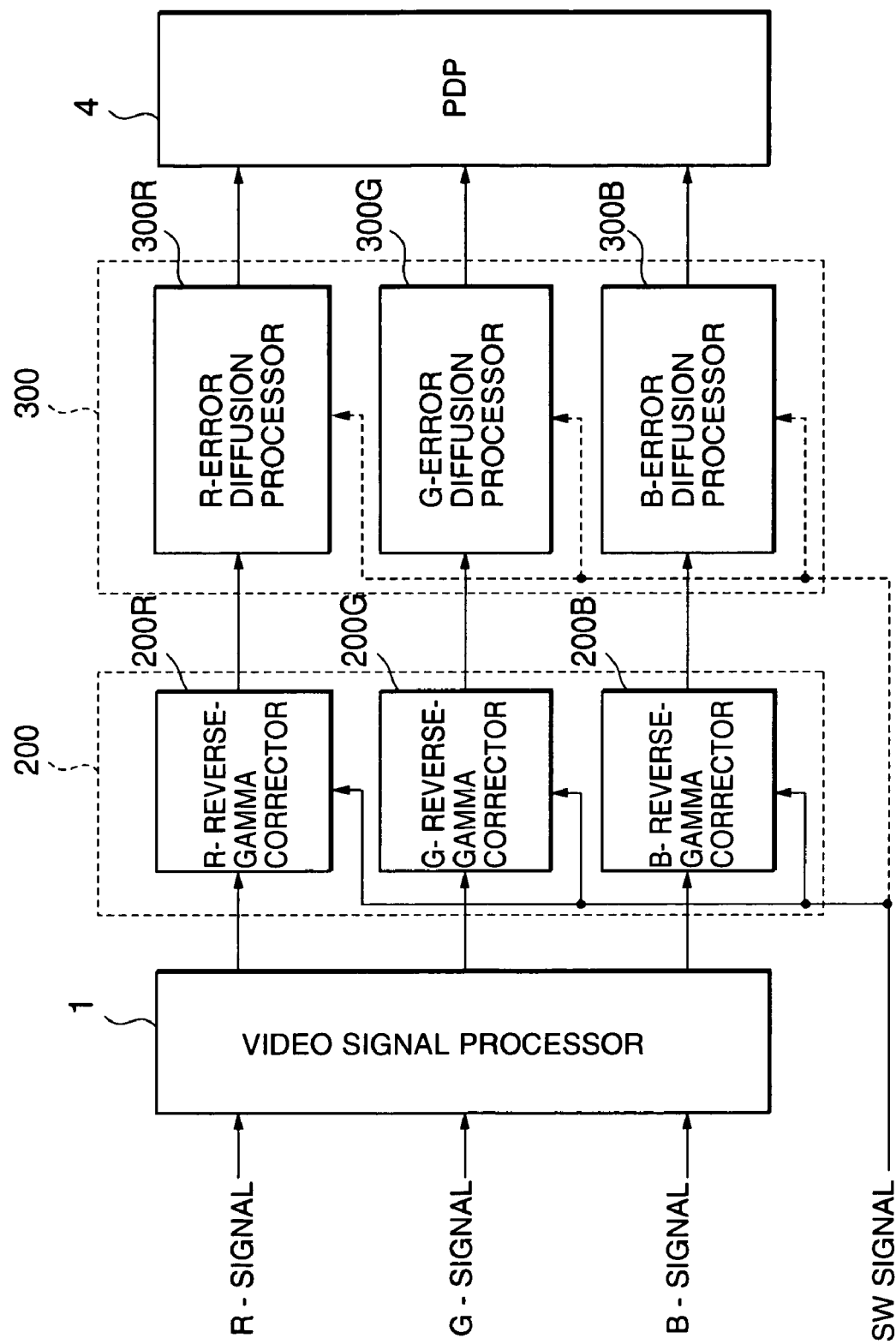
FIG. 17 shows a block diagram of the fourth preferred embodiment of an image displaying apparatus according to the present invention.

In FIG. 17, R-, G- and B-signals are fed to the video signal processor 1. The processor 1 processes the video signals by several video processing. The R-, G- and B-signals in this embodiment are 8-bit digital signals, or video signals of 256 gradation levels.

The processed R-, G-, and B-signals are fed to a R-reverse-gamma corrector 200R, a G-reverse-gamma corrector 200G and a B-reverse-gamma corrector 200B, respectively, of a reverse-gamma corrector 200, for applying reverse-gamma correction. The corrector 200 outputs 12-bit R-, G- and B-digital signals, or video signals of 496 gradation levels, based on the input 8-bit digital signals to keep gradation levels which would otherwise be depressed due to the reverse-gamma correction. All the reverse-gamma correction characteristics applied to the R-, G- and B-signal may be the same or different from each other.

The output R-, G-, and B-signals of the reverse-gamma corrector 200 are fed to R-, G- and B-error diffusion processors 300R, 300G and 300B, respectively, of an error diffusion processor 300. Each error diffusion processor in this embodiment processes the 12-bit digital signal so that the lower 4 bits of the 12 bits with a constant weighting are diffused into the upper 8 bits of the 12 bits, to output an 8-bit digital signal.

A switching (SW) signal is supplied to the R-, G- and B-reverse-gamma correctors 200R, 200G and 200B to turn on or off the error diffusion by the R-, G- and B-error diffusion processors 300R, 300G and 300B to the R-, G- and B-signals, and switching the reverse-gamma correction characteristics according to the switch-on or -off of the error diffusion.

As disclosed later, a specific reverse-gamma correction processing of the invention halts the error diffusion processing.

As depicted by the dotted line, switch-on or -off of the error diffusion can be performed by the same switching signal also supplied to the R-, G- and B-error diffusion processors 300R, 300G and 300B.

The feature of the fourth embodiment lies in that the reverse-gamma correction characteristics of the R-, G- and B-reverse-gamma correctors 200R, 200G and 200B are changed according to the switch-on or -off of the error diffusion by the R-, G- and B-error diffusion processors 300R, 300G and 300B.

The R-, G- and B-signals processed by or not processed by the R-, G- and B-error diffusion processors 300R, 300G and 300B for error diffusion are fed to the PDP 4 for sub-filed processing to display images of R-, G- and B-signals on a screen.

Figure 18:
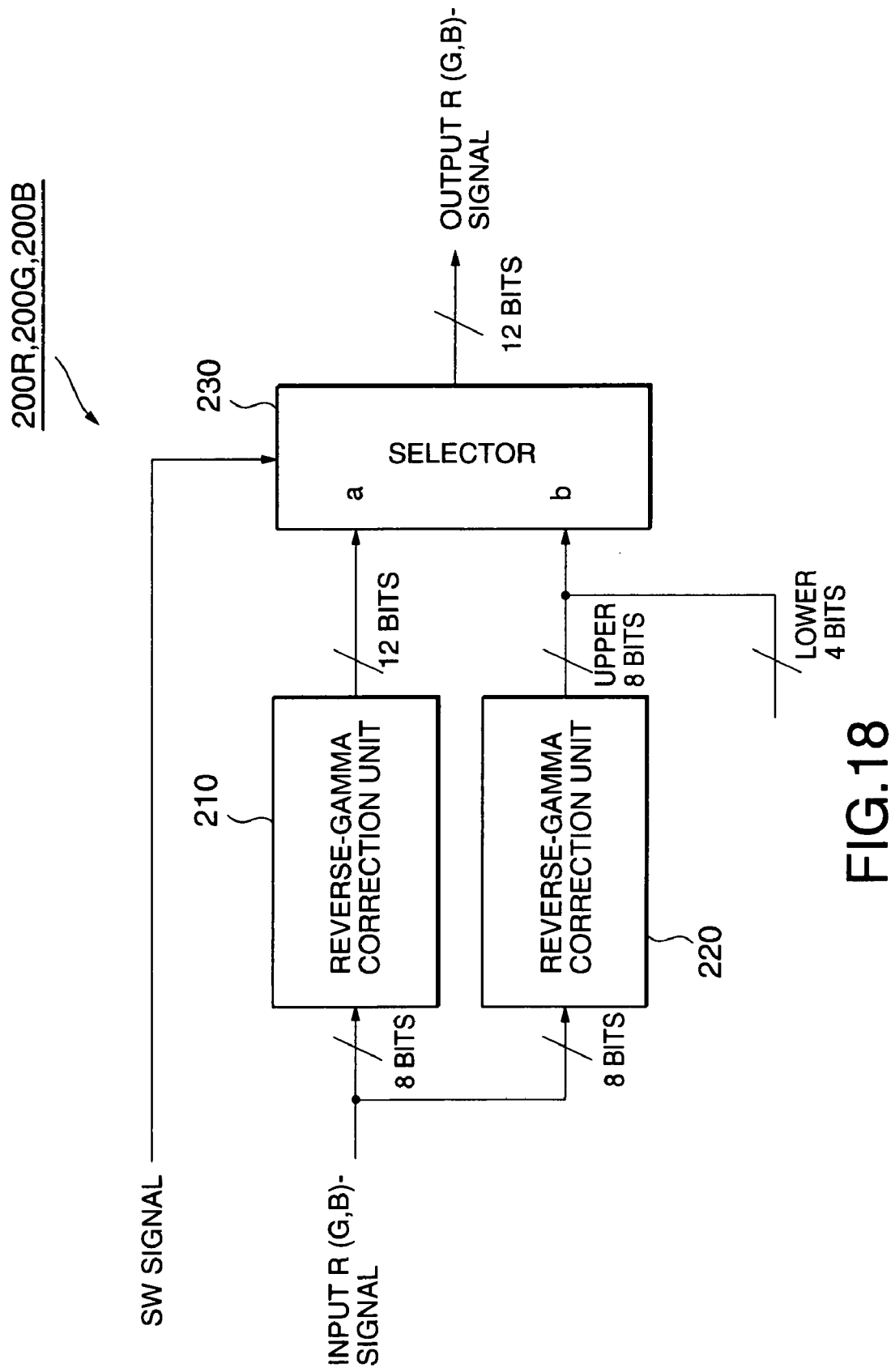
FIG. 18 shows a block diagram of a reverse-gamma corrector installed in the fourth preferred embodiment of FIG. 17.

Shown in FIG. 18 is a block diagram of the R-, G- and B-reverse-gamma correctors 200R, 200G and 200B having the same circuitry.

The 8-bit R (G or B)-signal from the video processor 1 (FIG. 17) is fed to reverse-gamma correction units 210 and 220. Each unit is a microcomputer having a ROM that stores a reverse-gamma conversion table.

The reverse-gamma correction unit 210 applies 12-bit reverse-gamma correction to the 8-bit R(G or B)-signal to output a 12-bit R(G or B)-signal. The 12-bit R(G or B)-signal is then fed to a selector 230 via a terminal "a".

The reverse-gamma correction unit 220 applies 8-bit reverse-gamma correction to the 8-bit R(G or B)-signal to output an 8-bit R(G or B)-signal. A bit data "0000" is added to the 8-bit R(G or B)-signal as the lower 4 bits to output a 12-bit R(G or B)-signal. This 12-bit R(G or B)-signal is fed to the selector 230 via a terminal "b".

The reverse-gamma correction unit 210 applies reverse-gamma correction with an optimum characteristics to the R(G or B)-signal when the error diffusion is performed by the error diffusion processor 300. On the other hand, the reverse-gamma correction unit 220 applies reverse-gamma correction with an optimum characteristics to the R(G or B)-signal when the error diffusion is not performed.

Figure 19:
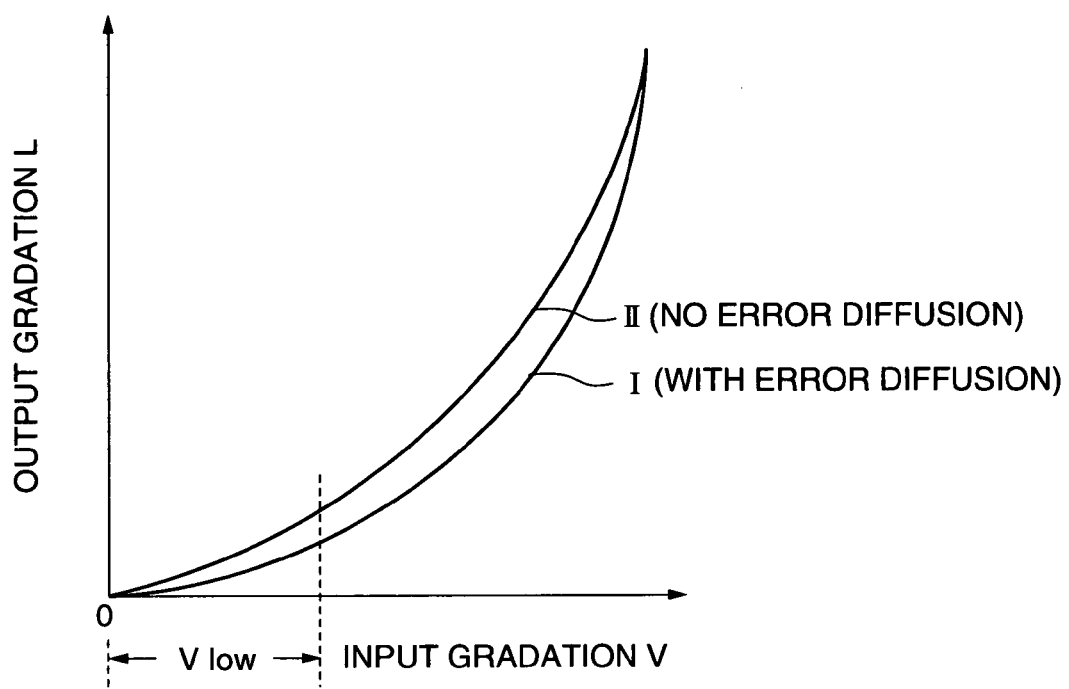
FIG. 19 illustrates reverse-gamma correction characteristics curves for the reverse-gamma corrector shown in FIG. 16.

The characteristics of the reverse-gamma correction performed by the units 210 and 220 are different from each other as represented by the curves I and II, respectively, shown in FIG. 19. In the figure, the abscissa and ordinate represent input and output gradation levels V and L, respectively.

As illustrated in FIG. 19, the characteristics II for the reverse-gamma correction unit 220 exhibits a large variation of the output gradation level L to the input gradation level V in the low gradation range Vlow from the gradation level zero (black level) to a predetermined level, compared to the characteristics I for the reverse-gamma correction unit 210.

The curves are shown in FIG. 19 for the characteristics I and II. However, each curve can be approximated by a linear function (straight line) from the gradation level zero to a specific level, followed by a curve. The variation in the low gradation range Vlow corresponds to the gradient from the gradation level zero to the point of inflection of the linear function and the curve.

This reverse-gamma correction characteristics setting achieves image displaying with a high quality in spit of error diffusion processing. This is because the gradation levels will not be lost so much in the low gradation range Vlow by the characteristics setting even no error diffusion is applied, thus avoiding images of discontinuous gradation levels in which some bits have been dropped.

The application of the characteristics II also to the reverse-gamma correction unit 210 when the error diffusion is performed is of no use.

As discussed above, it is very important for the reverse-gamma correctors 200R, 200G and 200B to have the different reverse-gamma correction characteristics according to whether the error diffusion is performed by the R-, G- and B-error diffusion processors 300R, 300G and 300B.

In FIG. 18, the switching signal is supplied to the selector 230 for selection of the terminal "a" when the switching signal is "1" representing that error diffusion will be performed; while the terminal "b" when the switching signal is "0" representing that error diffusion will not be performed.

Error diffusion processing is required for displaying images based on television signals; while it is not required for displaying images based on signals from personal computer or fixed patter signals.

The R(G or B)-signal output by the selector 230 is fed to the R(G or B)-error diffusion processor 300R (300G or 300B). The selector 230 operates as a switch to switch the reverse-gamma correction characteristics of the reverse-gamma corrector 200R (200G or 200B) according to whether error diffusion processing is performed.

Figure 20:
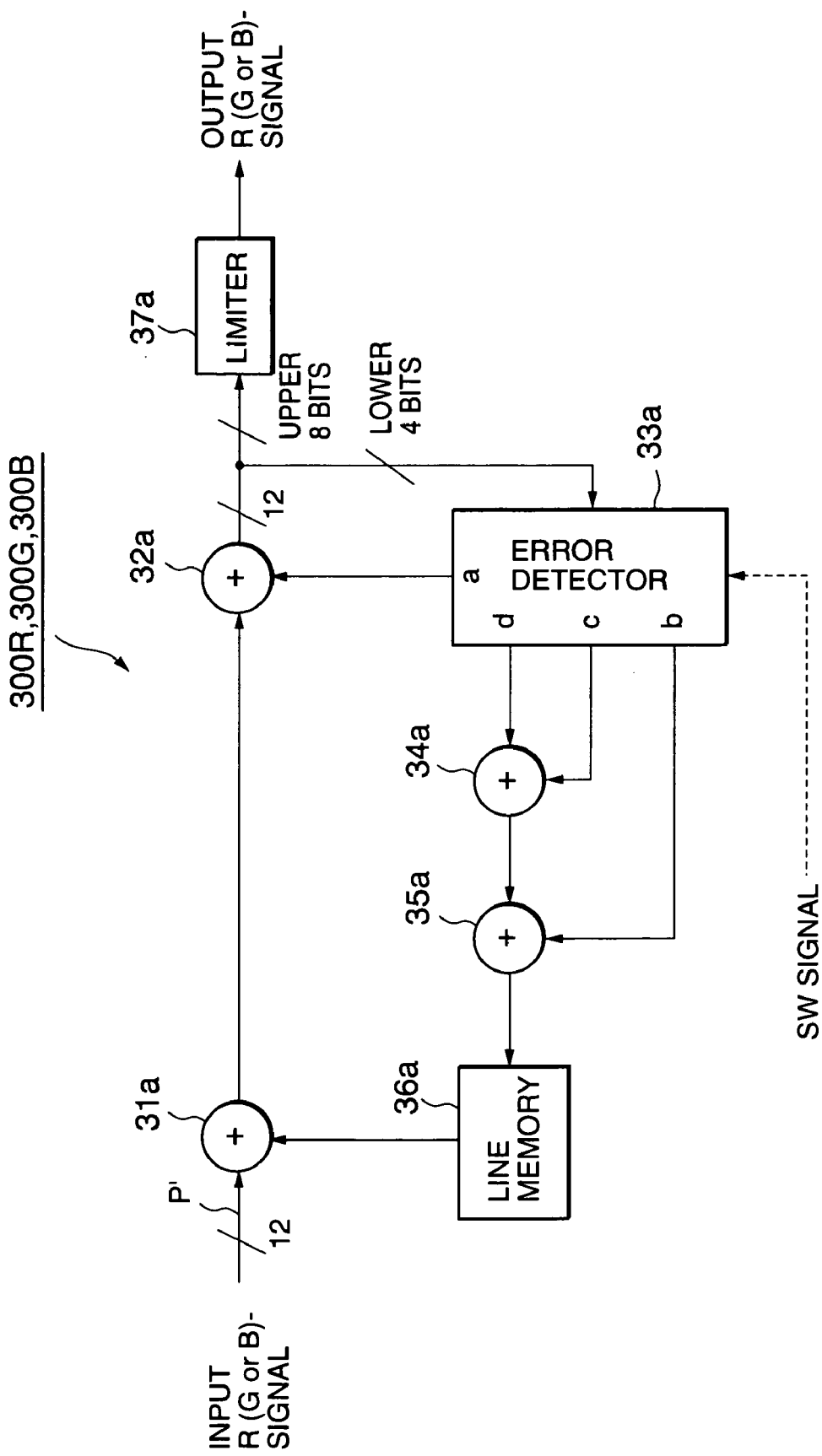
FIG. 20 shows a block diagram of an error diffusion processor installed in the fourth preferred embodiment of FIG. 17.

Shown in FIG. 20 is a block diagram of the R-, G- and B-error diffusion processors 300R, 300G and 300B having the same circuitry.

The 12-bit R(G or B)-signal from the R(G or B)-reverse-gamma corrector 200R(200G or 200B) is output via adders 31$a$ and 32$a$.

The lower 4 bits of the 12-bit data output by the adder 32$a$ is fed to an error detector 33$a$. The lower 4 bits correspond to the gradation difference that will be lost by converting the 12-bit digital signal (4096 gradations) into an 8-bit digital signal (256 gradations).

Figure 21:
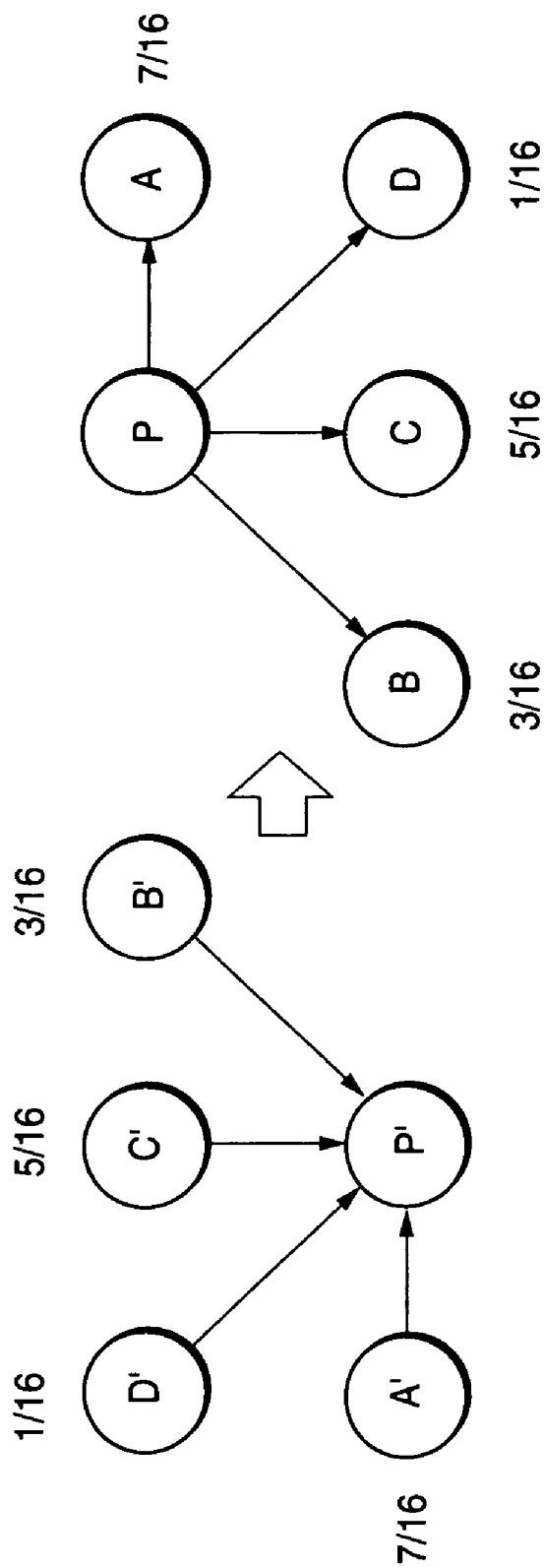
FIG. 21 illustrates error diffusion processing by the error diffusion processor shown in FIG. 20.

The error detector 33$a$ multiplies the lower 4-bit data by error diffusion coefficients 7/16, 3/16, 5/16 and 1/16 according to dots A' to D', respectively, that surround a dot P', as shown in FIG. 21, to output error data via terminals "a" to "d", in this embodiment.

The error data output via the terminals "a", "b", and "c" and "d" are fed to the adder 32$a$, an adder 35$a$, and an adder 34$a$, respectively. The adder 34$a$ adds the error data from the terminals "d" and "c". The output of the adder 34$a$ is fed to the adder 35$a$ and added to the error data from the terminal "b". The addition result is fed to a line memory 36$a$ by which the output of the adder 35$a$ is delayed by a period slightly shorter than a period for one line and fed to the adder 31$a$.

The output of the line memory 36$a$ and the input R(G or B)-signal are added by the adder 31$a$ and fed to the adder 32$a$. The input R(G or B)-signal corresponds to the dot P' in FIG. 21 in this embodiment. The adder 31$a$ performs addition of the output of the line memory 36$a$ that is the error data generated one line ago to the dot P', or B'×3/16+C'×5/16+D'×1/16.

The output of the line memory 3 and the input R(G or B)-signal are added by the adder 31$a$ and fed to the adder 32$a$. The input R(G or B)-signal corresponds to the dot P' in FIG. 21 in this embodiment. The adder 31$a$ performs addition of the output of the line memory 36$a$ that is the error data generated one line ago to the to the dot P1, or B'×3/16+C'×5/16+D'×1/16.

The output of the adder 31$a$ is added by the adder 32$a$ to the error data output by the error detector 33$a$ via the terminals "a". The adder 32$a$ performs addition of the output of the adder 31$a$ and the error data A'×7/16 generated by the error detector 33$a$ one dot ago.

As disclosed, error data generated by multiplying the dots A', B', C' and D' by their respective error diffusion coefficients are added to the dot P' in FIG. 21. The next lower 4 bits of the output 12-bit data of the adder 32$a$ are fed to the error detector for repetition of the same processing described above.

On the other hand, the upper 8 bits of the output 12-bit data of the adder 32$a$ are fed to a limiter 37$a$ for limiting an overflow data portion of the data obtained by error data addition to the dot P' that exceeds the 8 bits, to output a R(G or B)-signal.

The error data addition to the dot P' per dot (A', B', C' and D') as described above means diffusion of the data of the dot P' toward the surrounding dots A, B, C and D by multiplying the lower 4 bit-data of the dot P' by the error diffusion coefficients 7/16, 3/16, 5/16 and 1/16, as shown in FIG. 21.

As disclosed, the R-, G- and B-error diffusion processor 300R, 300G, 300B apply error diffusion to the R-, G- and B-signals, respectively, at the pixel composed of the three dots of the R-, G- and B-signals, to output the 12-bit data as the 8-bit data.

When the selector 230 (FIG. 18) selects the output of the reverse-gamma correction unit 220, the lower 4 bits of each of the 12-bit R-, G- and B-signals are all "0000", as already described, so that the error data output by the error detector 33$a$ (FIG. 20) is zero. This indicates that all the error diffusion processors 300R, 300G and 300B are out of operation.

In the fourth embodiment, the reverse-gamma corrector 200 having the R-, G- and B-reverse-gamma correctors 200R, 200G and 200B performs 8-bit reverse-gamma correction to add the lower 4 bits "0000" to its output for producing a 12-bit signal, and selecting the output of the reverse-gamma correction unit 220 for no performance of error diffusion processing by the error diffusion processor 300.

As disclosed, according to the fourth embodiment, the selector 230 (FIG. 18) installed in each of the R-, G- and B-reverse-gamma correctors 200R, 200G and 200B operates as the first switch to turn on or off error diffusion (multi-gradation processing) to be performed by the R-, G- and B-error diffusion processors 300R, 300G and 300B.

Moreover, the selector 230 operates as the second switch for switching the reverse-gamma correction characteristics for the R-, G- and B-reverse-gamma correctors 200R, 200G and 200B between the first state in which error diffusion is required and the second state in which error diffusion is not required.

In other words, the selector 230 acts as both the first and the second switches. However, the first and the second switches can be separately provided.

In FIG. 18, the reverse-gamma correction unit 220 performs 8-bit reverse-gamma correction, with addition of the lower bits "0000" to its output for producing a 12-bit signal. However, the same as the reverse-gamma correction unit 210, the unit 220 may perform 12-bit reverse-gamma correction, with replacement of the lower 4 bits with "0000" generated in the unit 220 or supplied by another circuitry.

In either way, a signal processing to produce a 12-bit signal having "0000" for the lower 4 bits before being fed to the R-, G- and B-error diffusion processors 300R, 300G and 300B is a simple way to turn off these processors.

For another modification, a 12-bit signal can be fed to the R-, G- and B-error diffusion processors 300R, 300G and 300B, as it is with no signal processing to produce a 12-bit signal having "10000" for the lower 4 bits.

This is achieved in FIG. 20 in which the switching signal described above is supplied to the error detector 33*a* as indicated by the dotted-line to force the detector 33*a* to output the data zero when the switching signal is "0" indicating that no error diffusion is required. In this case, the error detector 33*a* acts as the first switch to turn on or off error diffusion as discussed above.

As disclosed above, the fourth embodiment achieves displaying of images with a high quality in spite of input signals, such as, television signals to which error diffusion is required, and signals from personal computers or fixed pattern signals to which no error diffusion is required, with application of reverse-gamma correction optimum to each signal.

Moreover, the fourth embodiment can turn off the R-, G- and B-error diffusion processors 300R, 300G and 300B with the data "0000" for the lower 4 bits of the signal input thereto and used for error diffusion to the R-, G- and B-signals.

As disclosed above, the fourth embodiment is provided with the first switch to turn on or off multi-gradation processing by an error diffusion processor and the second switch to switch the reverse-gamma correction characteristics of a reverse-gamma corrector between the first state in which multi-gradation processing is required by an error diffusion processor and the second state in which no multi-gradation processing is required.

Accordingly, the fourth embodiment will not lose gradation levels so much in the low gradation range for the state in which multi-gradation processing is not required. Thus, no images of discontinuous gradation levels with bits having been dropped will be reproduced. The fourth embodiment achieves displaying of images with a high quality in spite of multi-gradation processing using error diffusion.

Furthermore, the fourth embodiment turns off the R-, G- and B-error diffusion processors 300R, 300G and 300B with the data "0000" for the lower 4 bits of the signal input thereto and used for error diffusion to the R-, G- and B-signals.

The fourth embodiment also forces the error detector of each of the R-, G- and B-error diffusion processors 300R, 300G and 300B to output the error data zero for no performance of error diffusion processing.

The fourth embodiment thus achieves no operation of error diffusion processing by a simple way with no increase in circuit components.

The Fifth Preferred Embodiment

The fifth embodiment relates to a displaying apparatus having a reverse-gamma corrector, and also a displaying apparatus having a reverse-gamma corrector and an error diffusion processor.

This embodiment uses a PDP as a matrix-type displaying device capable of displaying images only at a digitally-limited number of gradation levels. Not only a PDP, the present invention can use other types of image displaying apparatus, such as, those already introduced.

Figure 22:
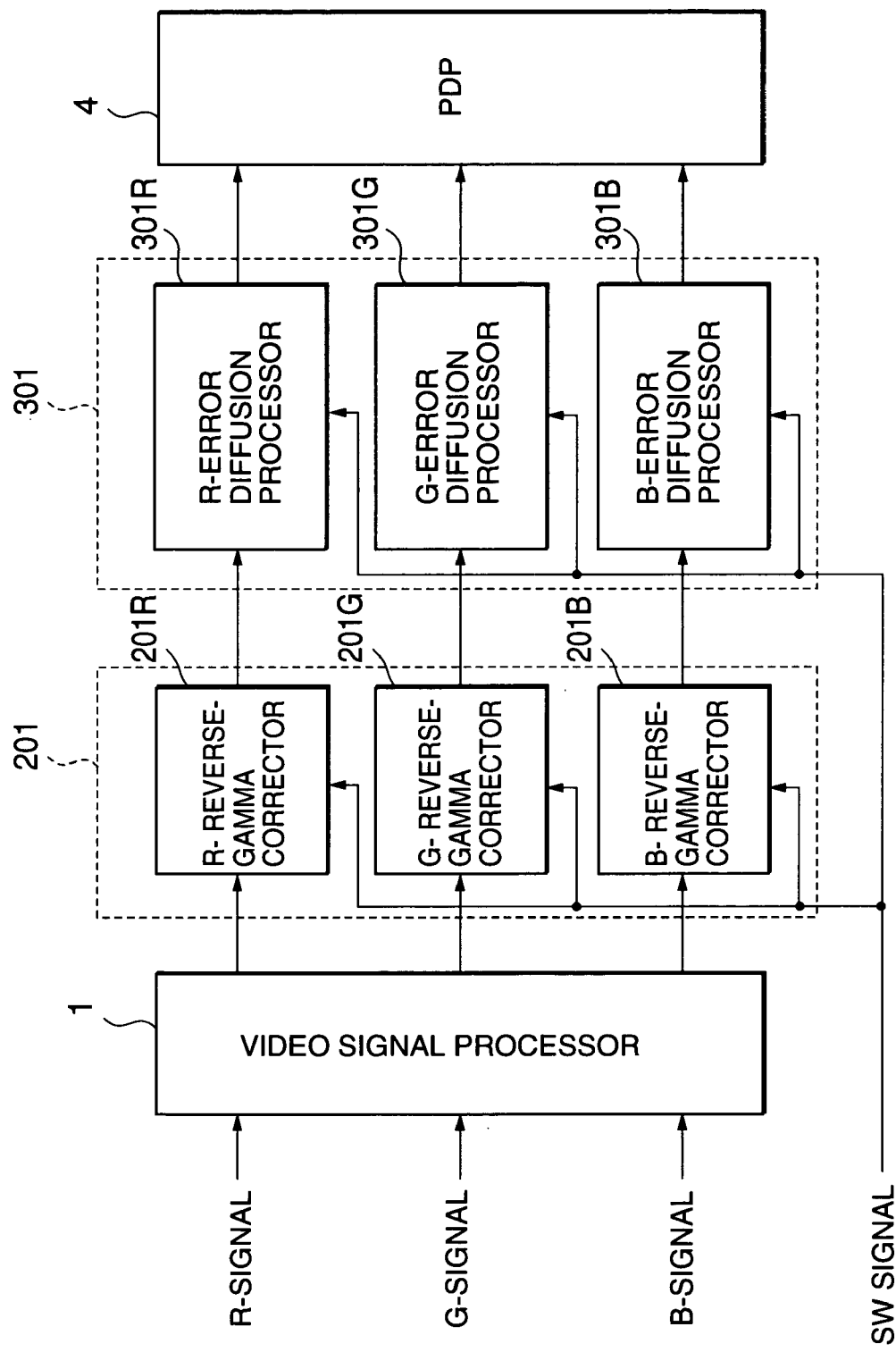
FIG. 22 shows a block diagram of the fifth preferred embodiment of an image displaying apparatus according to the present invention.

In FIG. 22, R-, G- and B-video signals are fed to the video signal processor 1. The R-, G- and B-video signals in this embodiment are 8-bit digital signals, or video signals of 256 gradation levels.

The processed video signals are fed to a reverse-gamma corrector 201 having a R-, G- and B-reverse-gamma correctors 201R, 201G and 201B for applying the reverse-gamma correction. The corrector 201 in this embodiment outputs a 12- or an 11-bit digital signal, or video signals of 4096 or 2048 gradation levels based on each input 8-bit digital signal to keep gradation levels which would otherwise be depressed due to the reverse-gamma correction.

The reverse-gamma correction characteristics for the R-, G- and B-signals may be the same or different from each other according to the characteristics of the PDP 4.

The output R-, G-, and B-signals of the reverse-gamma corrector 201R, 201G and 201B are fed to R-, G- and B-error diffusion processors 301R, 301G and 301B, respectively, of an error diffusion processors 301.

The processors 301R, 301G and 301B perform error diffusion processing to the R-, G-, and B-signals, respectively, for a 12-bit digital signal, to apply a constant weighting to the lower 4 bits of the 12 bits for diffusion to the upper 8 bits, thus outputting an 8-bit digital signal, while, for an 11-bit digital signal, to apply a constant weighting to the lower 3 bits of the 11 bits for diffusion to the upper 8 bits, thus outputting an 8-bit digital signal.

A switching (SW) signal is supplied to the R-, G- and B-reverse-gamma correctors 201R, 201G and 201B for switching two types of reverse-gamma correction characteristics in this embodiment. One of the characteristics is used to output an 8-bit digital signal as a 12-bit digital signal. The other is used to output an 8-bit digital signal as an 11-bit digital signal. This switching operation is one of the features of the fifth embodiment.

The switching signal is further used to switch the operation of the R-, G- and B-error diffusion processors 301R, 301G and 301B.

In this embodiment, switching of reverse-gamma correction characteristics and of error diffusion work with each other, which is another feature of the fifth embodiment.

Still another feature of the fifth embodiment is optimization of the relationship between the reverse-gamma correction characteristics of the R-, G- and B-reverse-gamma correctors 201R, 201G and 201B and the resolution of the R-, G- and B-error diffusion processors 301R, 301G and 301B, which will be discussed later.

The R-, G- and B-signals that have been applied error diffusion by the R-, G- and B-error diffusion processors 301R, 301G and 301B are fed to the PDP 4 for displaying images of the R-, G- and B-signals with sub-field processing.

Figure 23:
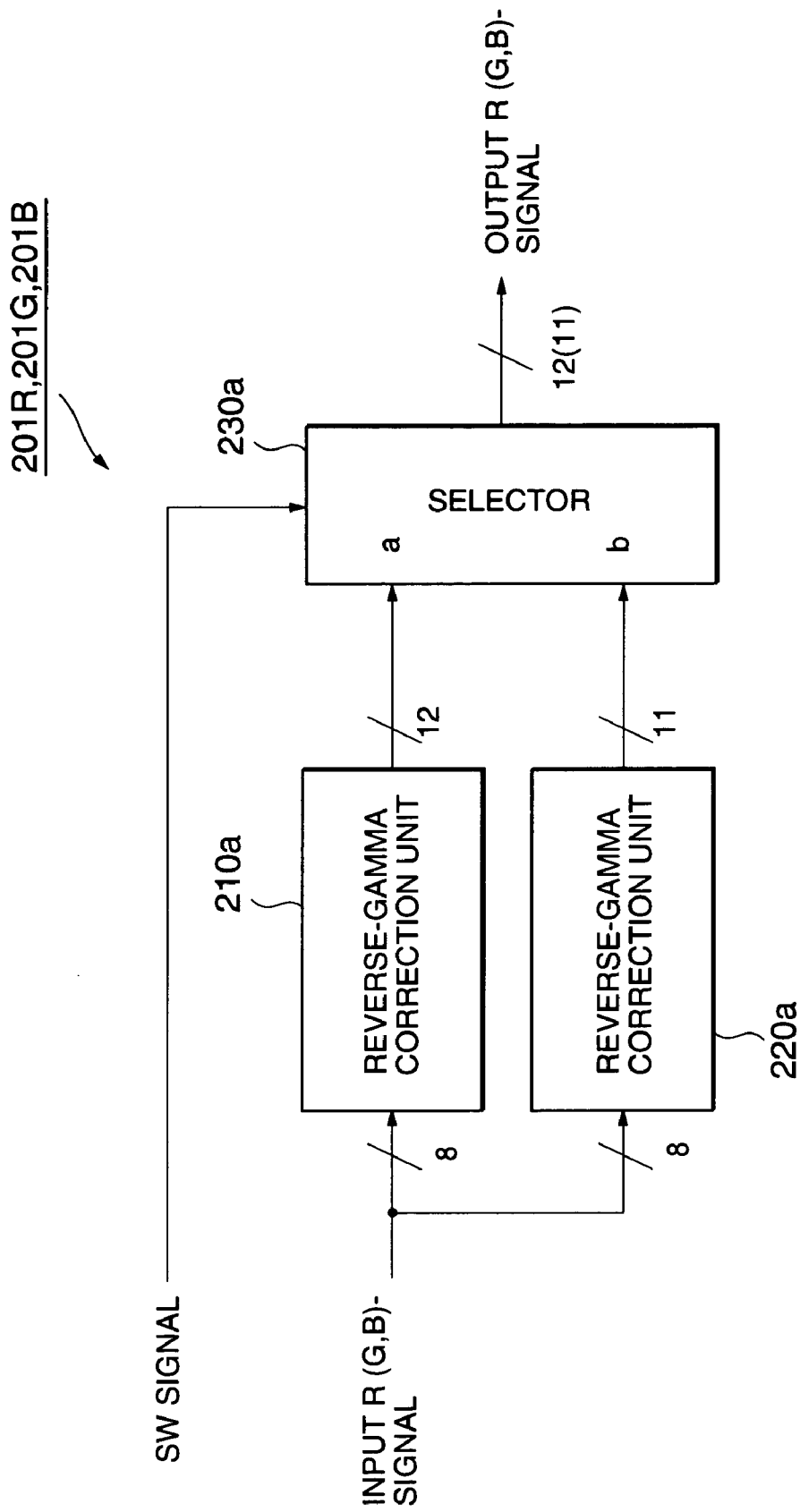
FIG. 23 shows a block diagram of a reverse-gamma corrector installed in the fifth preferred embodiment of FIG. 22.

Shown in FIG. 23 is a block diagram of the R-, G- and B-reverse-gamma correctors 201R, 201G and 201B having the same circuitry.

The output 8-bit R(G or B)-signal of the video processor 1 (FIG. 22) is fed to reverse-gamma correction units 210*a* and 220*a*. Each unit is a microcomputer having a ROM that stores a reverse-gamma conversion table.

The reverse-gamma correction unit 210*a* applies 12-bit reverse-gamma correction to the 8-bit R(G or B)-signal to output a 12-bit R(G or B)-signal. The 12-bit R(G or B)-signal is then fed to a selector 230*a* via a terminal "a".

The reverse-gamma correction unit 220*a* applies 11-bit reverse-gamma correction to the 8-bit R(G or B)-signal to output an 11-bit R(G or B)-signal. This 11-bit R(G or B)-signal is fed to the selector 230*a* via a terminal "b".

The reverse-gamma correction characteristics of the reverse-gamma correction unit 210*a* exhibits a small gradient at the straight line portion of the low gradation range. On the other hand, the reverse-gamma correction characteristics of the reverse-gamma correction unit 220a exhibits a large gradient at the straight line portion of the low gradation range.

Figure 24:
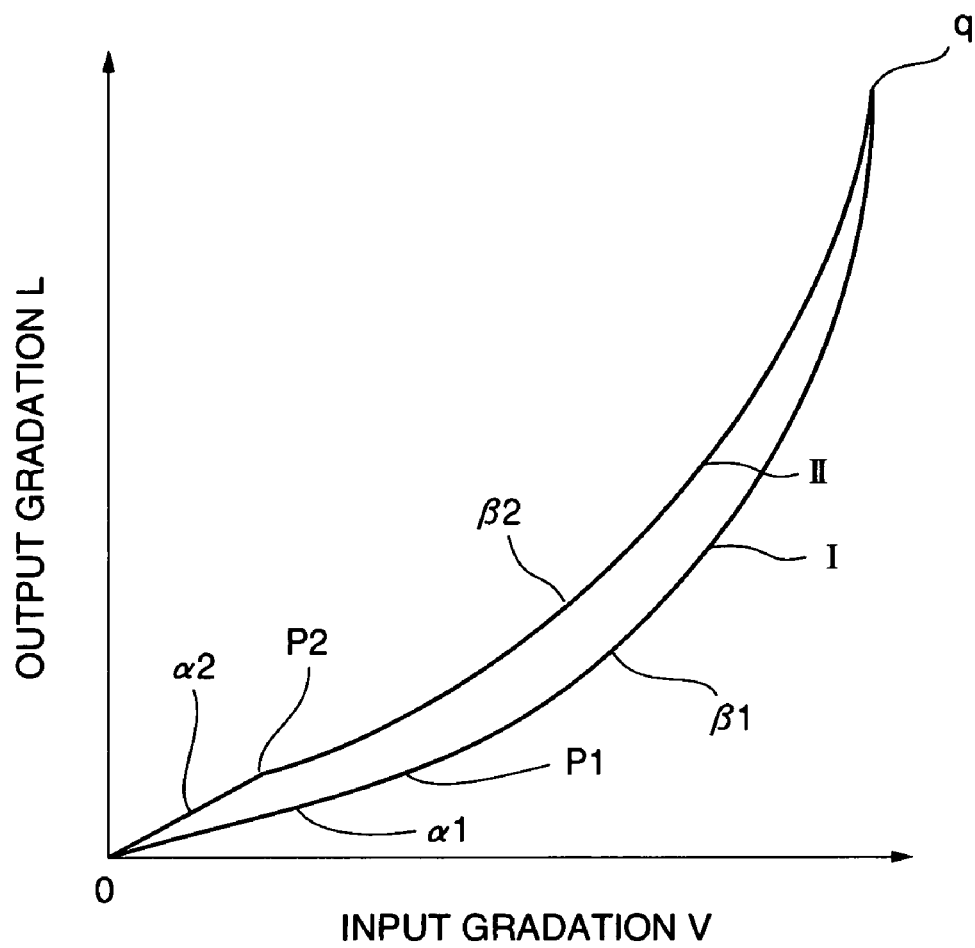
FIG. 24 illustrates reverse-gamma correction characteristics curves for the reverse-gamma corrector shown in FIG. 23.

In detail, the reverse-gamma correction characteristics of the reverse-gamma correction units 210a and 220a are different from each other as shown in FIG. 24.

FIG. 24 represents the reverse-gamma correction characteristics exhibiting the relationship between the input gradation level V (abscissa) and the output gradation level L(ordinate).

The characteristics curve I exhibits a small gradient at the straight line portion of the low gradation range for the reverse-gamma correction unit 210a.

The characteristics curve II exhibits a large gradient at the straight line portion of the low gradation range for the reverse-gamma correction unit 220a.

In detail, the characteristics curve I has the straight line portion α1 from the gradation level zero (black level) to a predetermined gradation level. The straight line portion α1 is followed by the curve portion β1 at the point of inflection P1.

The characteristics curve II has the straight line portion α2 from the gradation level zero (black level) to a predetermined gradation level. The straight line portion α2 is followed by the curve portion β2 at the point of inflection P2.

The characteristics curves I and II are connected to each other at the maximum gradation level "q".

FIG. 24 is exaggerated for visually easy understanding of each characteristics curve that is composed of the straight line portion and the curve portion connected to each other.

The followings can been seen from FIG. 24 when the characteristics curves I and II are compared:

The gradient of the straight line portion a 2 of the characteristics II is larger than that of the straight line portion α1 of the characteristics I.

The length of the straight line portion a 2 from the gradation level zero (input gradation V) to the point of inflection P2 is shorter than that of the straight line portion α1 from the gradation level zero (input gradation V) to the point of inflection P1.

The lengths of the straight line portions α1 and α2 are different as above because the curve portions α1 and α2 have been formed by rotating a parabolic curve around the point "q" as the center and connecting it to the straight line portions α1 and α2. The curve portions β1 and β2 are thus the same as each other. However, they may be different from each other; on the other hand, the lengths of the straight line portions α1 and α2 may be the same as each other.

The straight line portions α1 and α2, and the curve portions β1 and β2 are connected as being bent at the points of inflection P1 and P2, respectively, as shown in FIG. 24.

It is, however, preferable that they are connected as continuously, or the differential values (gradients) at the points of inflection P1 and P2 are equal to each other.

As shown, since the gradients are different, the reverse-gamma correction characteristics curves are different from each other.

One of the characteristics curves I or II is preferably expressed as follows:

$$L = V/4.0 \ (V<0.0913) \tag{1a}$$

$$L = \{(V+0.1115)/1.1115\}^{1/0.45} (V \geq 0.0913) \tag{1b}$$

The expressions (1a) and (1b) are obtained by normalizing the maximum gradation with 1 when the input and output gradations levels are V and L, respectively.

The expression (1a) expresses the straight line portions a 1 and a 2 from the gradation level zero to predetermined gradation levels. The expression (1b) expresses the curve portions β1 and β2 connected to the straight line portions α1 and α2, respectively.

The gradient 1/t of the straight line portions α1 and α2 is 1/4.0, and the connecting point "0.0913" of the expressions (1a) and (1b) is the point of inflection.

The characteristics curves I and II may be different from those expressed by the expressions (1a) and (1b). The reverse-gamma correction characteristics for the reverse-gamma correction units 210a and 220a (FIG. 23) preferably accurately regain video signals that have been applied the gamma correction at the transmission side. This is, however, not a must.

In FIG. 23, the switching signal discussed above is supplied to the selector 230a for selection of the terminal "a" when the switching signal is "1", while the terminal "b" when the switching signal is "0", to switch the reverse-gamma correction characteristics.

Two types of the reverse-gamma correction characteristics (or more than two) provide images of an optimum quality displayed on the PDP 4 by switching the characteristics in response to input signals (television signals or signals from personal computers) according to the input gamma correction characteristics, formats (scanning types), horizontal and vertical frequencies, resolutions, image patterns (contents), viewer's need, and so on.

A 12- or an 11-bit R(G or G)-signal output by the selector 230a (FIG. 23) is fed to the R(G or B)-error diffusion processor 301R (301G or 301B). The selector 230a acts as the switch to switch the reverse-gamma correction characteristics of the R (G or B)-reverse-gamma corrector 201R (201G or 201B) shown in FIG. 22. In the fifth embodiment, the gradients of the straight line portions of the reverse-gamma correction characteristics composed of the straight line and curve portions is switched, for effective switching of images displayed on the PDP 4.

Figure 25:
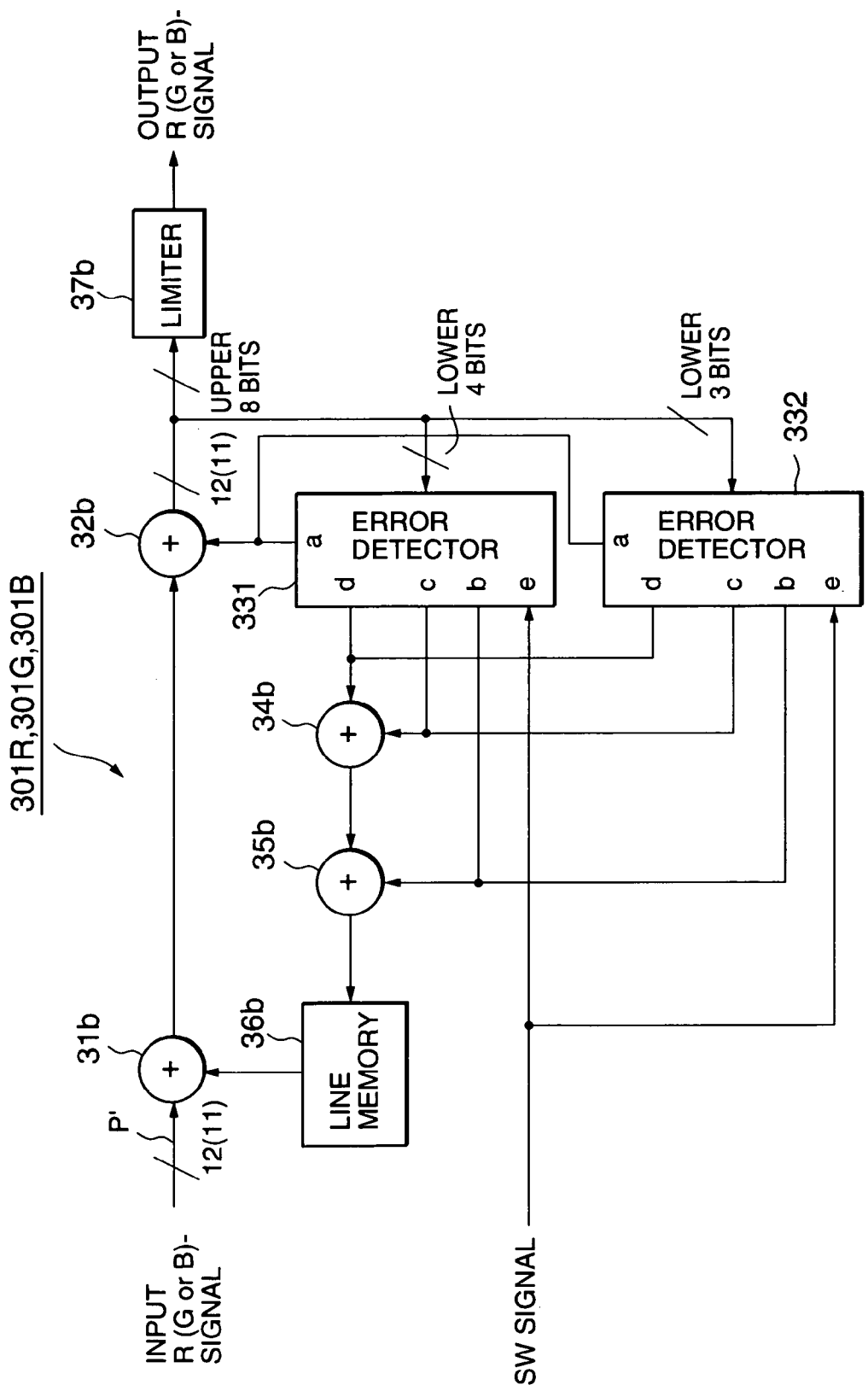
FIG. 25 shows a block diagram of an error diffusion processor installed in the fifth preferred embodiment of FIG. 22.

Shown in FIG. 25 is a block diagram of the R-, G- and B-error diffusion processors 301R, 301G and 301B having the same circuitry.

The 12- or an 11-bit R(G or G)-signal input by the R(G or B)-reverse-gamma corrector 201R(201G or 201B) shown in FIG. 22 is output via adders 31b and 32b.

Figure 26A:
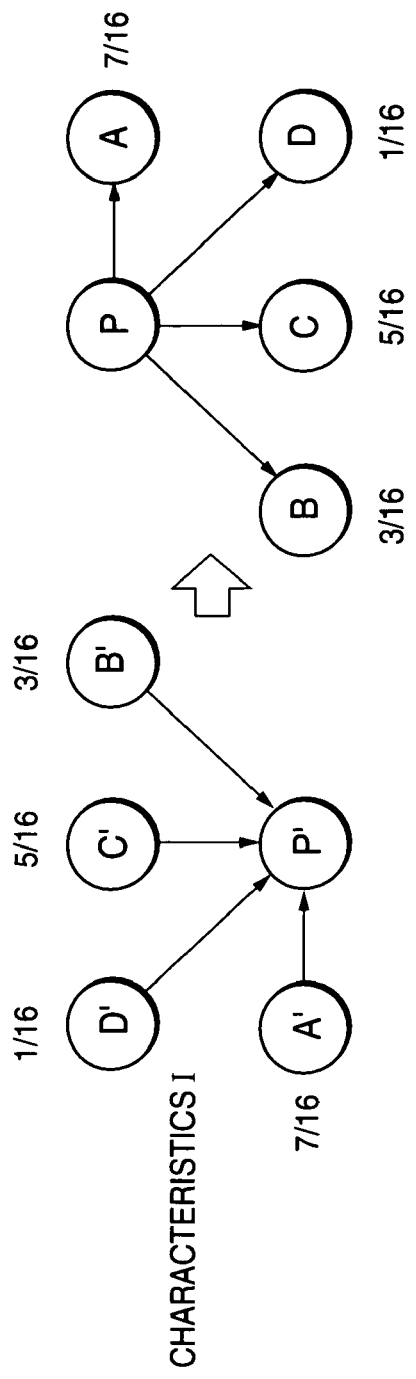
FIGS. 26A and 26B illustrate error diffusion processing by the error diffusion processor shown in FIG. 25.

When the 12-bit R(G or G)-signal is input, or the terminal "a" of the selector 230a (FIG. 23) is selected, the lower 4 bits of the 12-bit data output by the adder 32b are fed to an error detector 331. The lower 4 bits correspond to the gradation difference that will be lost by converting the 12-bit digital signal (4096 gradations) to an 8-bit digital signal (256 gradations). The error detector 331 generates error data by multiplying the input lower 4-bit data by error diffusion coefficients, according to dots A', B', C' and D' that surround a dot P', as shown in FIG. 26A.

Figure 26B:
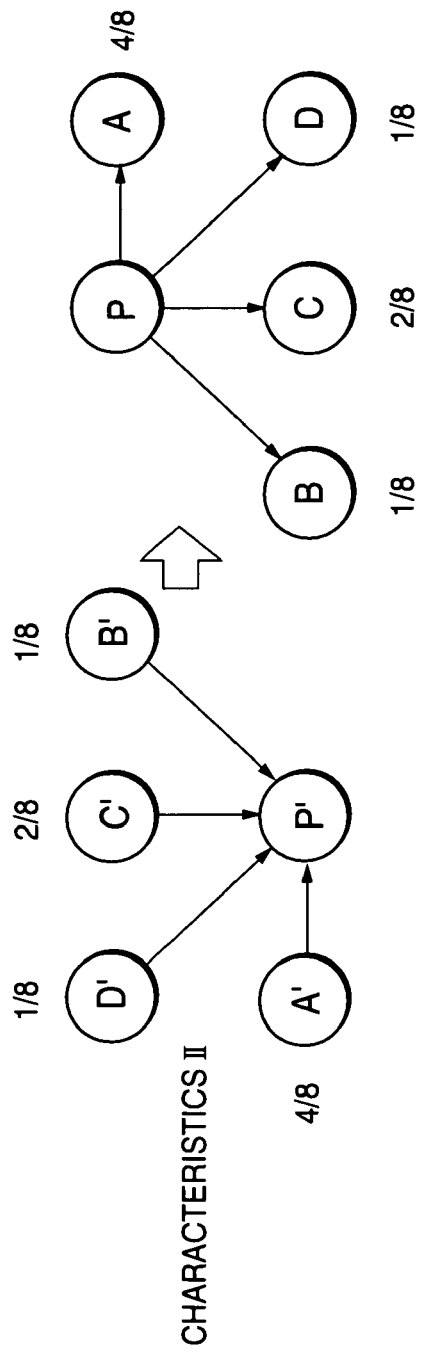

On the other hand, when the 11-bit R(G or G)-signal is input, or the terminal "b" of the selector 230a (FIG. 23) is selected, the lower 3 bits of the 11-bit data output by the adder 32b are fed to an error detector 332. The lower 3 bits correspond to the gradation difference that will be lost by converting the 11-bit digital signal (2048 gradations) to an 8-bit digital signal (256 gradations). The error detector 332 generates error data by multiplying the input lower 4-bit data by error diffusion coefficients, according to dots A', B', C' and D' that surround a dot P', as shown in FIG. 26B.

The switching signal discussed above is supplied to each terminal "e" of the error detectors 331 and 332. The error detector 331 operates when the switching signal is "1", while the error detector 332 operates when the switching signal is "0". In other words, the error detectors 331 and 332 do not operate at the same time. In detail, the error detector 331 operates when the selector 230a (FIG. 23) selects the output of the reverse-gamma correction unit 210a, while the error detector 332 operates when the selector 230a selects the output of the reverse-gamma correction unit 220a. The error detectors 331 and 332 act as the switch to switch the number of lower bits used for error diffusion.

Explanation of the error detector 331 is given first.

The error detector 331 generates error data via its terminals "a", "b", "c" and "d", by multiplying the lower 4-bit data by the error diffusion coefficients 7/16, 3/16, 5/16 and 1/16, respectively, as shown in FIG. 26A.

The error data output via the terminals "a", "b", and "c" and "d" are fed to an adder 32b, an adder 35b, and an adder 34b, respectively. The adder 34b adds the error data from the terminals "d" and "c". The output of the adder 34b is fed to the adder 35b and added to the error data from the terminal "b". The addition result is fed to a line memory 36b by which the output of the adder 35b is delayed by a period slightly shorter than a period for one line and fed to an adder 31b.

The output of the line memory 36b and the input R(G or B)-signal are added by the adder 31b and fed to the adder 32b. The input R(G or B)-signal corresponds to the dot P1 in FIG. 26A in this embodiment. The adder 31b performs addition of the output of the line memory 36b that is the error data generated one line ago to the dot P', or B'×3/16+C'×5/16+D'1/16.

The output of the adder 31b is added by the adder 32b to the error data output from the error detector 331 via the terminals "a". The adder 32b performs addition of the output of the adder 31b and the error data A'×7/16 generated by the error detector 331 one dot ago.

As disclosed, error data generated by multiplying the dots A', B', C' and D' by their respective error diffusion coefficients are added to the dot P' in FIG. 26A. The next lower 4 bits of the output 12-bit data of the adder 32b are fed to the error detector 331 for repetition of the same processing described above.

On the other hand, the upper 8 bits of the output 12-bit data of the adder 32b are fed to a limiter 37b for limiting an overflow data portion of the data that is obtained by error data addition to the dot P' that exceeds the 8 bits, to output a R(G or B)-signal.

The error data addition to the dot P' per dot (A', B', C' and D') as described above means diffusion of the lower 4-bit data of the dot P toward the surrounding dots A, B, C and D by multiplying the lower 4 bit-data by the error diffusion coefficients 7/16, 3/16, 5/16 and 1/16, as shown in FIG. 26A.

As disclosed, the error diffusion processor 301R(301G or 301B) performs error diffusion at a pixel composed of three dots of R-, G- and B-signals, to output a 12-bit data as an 8-bit data.

Next, explanation of the error detector 332 is given.

The error detector 332 generates error data via its terminals "a", "b", "c" and "d", by multiplying the lower 3-bit data by the error diffusion coefficients 4/8, 1/8, 2/8 and 1/8, respectively, as shown in FIG. 26B.

The operation of the adders 31b, 32b, 34b and 35b and the line memory 36b are the same as those explained for the error detector 331.

The adder 31b performs addition of the output of the line memory 36b, the error data generated one line ago, or B'×1/8+C'×2/8+D'×1/8 to the dot P' shown in FIG. 26B.

The adder 32b performs addition of the error data generated further one dot ago, or A'×4/18, to the output of the adder 31b that has performed addition of error data generated one line ago to the dot P' shown in FIG. 26B.

As disclosed, the error data obtained by multiplying the surrounding dots A' to D' by respective error coefficients is added to the dot P' shown in FIG. 26B.

The next lower 3 bits of the output 11-bit data of the adder 32b are fed to the error detector 332 for repetition of the same processing described above.

On the other hand, the upper 8 bits of the output 11-bit data of the adder 32b are fed to the limiter 37b for limiting an overflow data portion of the data obtained by error data addition to the dot P' that exceeds the 8 bits, to output a R(G or B)-signal.

The error data addition to the dot P' per dot (A', B', C' and D') as described above means diffusion of the lower 3-bit data of the dot P toward the surrounding dots A, B, C and D by multiplying the lower 3 bit-data by the error diffusion coefficients 4/8, 1/8, 2/8 and 1/8, as shown in FIG. 26B.

As disclosed, the error diffusion processor 301R(301G or 301B) performs error diffusion at a pixel composed of three dots of R-, G- and B-signals, to output an 11-bit data as an 8-bit data.

As discussed above, when the R-, G- and B-reverse-gamma correctors 201R, 201G and 201B (FIG. 22) select the characteristics I (FIG. 24), the correctors perform 12-bit reverse-gamma correction to 8-bit R-, G- and B-signals to set the resolution of the R-, G- and B-error diffusion processors 301R, 301G and 301B (FIG. 22) at 4 bits (the number of lower bits used for error diffusion).

On the other hand, when the R-, G- and B-reverse-gamma correctors 201R, 201G and 201B select the characteristics II (FIG. 24), the correctors perform 11-bit reverse-gamma correction to 8-bit R-, G- and B-signals to set the resolution of the R-, G- and B-error diffusion processors 301R, 301G and 301B (FIG. 22) at 3 bits (the number of lower bits used for error diffusion).

The reason for these operations is as follows:

Suppose that the resolution of the R-, G- and B-error diffusion processors 301R, 301G and 301B is small for a small gradient of a straight line portion of the reverse-gamma correction characteristics, such as, the straight line portion α1 of the characteristics I (FIG. 24).

This causes generation of a small data amount to be diffused to surrounding dots with no smooth gradation change, thus reproducing images of discontinuous gradation levels in which some bits have been dropped.

For such cases, the R-, G- and B-error diffusion processors 301R, 301G and 301B require a certain number of bits as the resolution.

On the other hand, suppose that the resolution of the R-, G- and B-error diffusion processors 301R, 301G and 301B is large for a large gradient of a straight line portion of the reverse-gamma correction characteristics, such as, the straight line portion α2 of the characteristics II (FIG. 24).

This causes unnecessarily large resolution given to the R-, G- and B-error diffusion processors 301R, 301G and 301B, resulting waste of performance of the processors.

It is necessary that, the smaller the gradient of the straight line portion of the reverse-gamma correction characteristics, the larger the resolution of the R-, G- and B-error diffusion processors 301R, 301G and 301B, while the larger the gradient of the straight line portion, the smaller the resolution of the diffusion processors.

The straight line portion of the reverse-gamma correction characteristics and the resolution of the R-, G- and B-error diffusion processors 301R, 301G and 301B are preferably set as follows:

The gradient of the straight line portion of the reverse-gamma correction characteristics is set as $1/t$ ($1/t>0$, $t \geq 1$). The sign "t" is not necessarily an integer. The resolution of the R-, G- and B-error diffusion processors 301R, 301G and 301B is set at ½. The sign "n" represents the number of lower bits used for error diffusion processing.

The larger the "t", the larger the "n", while the smaller the "t", the smaller the "n". In other words, "n" is selected to satisfy the expression (2) according to "t" as the denominator of gradient $1/t$.

$$t = 2^n \qquad (2)$$

According to the expression (2), n=0 if t=1, n=1 if t=2, and n=2 if t=4. When "n" is an integer, the "n" can be set as the lower bits used for error diffusion processing. On the other hand, if "n" is a decimal number, the integer obtained by rounding down the decimal places can be set as the lower bits used for error diffusion processing.

The relationship between "t" and "n" is as follows:

$t=1 \rightarrow n=0$ $t=2 \rightarrow n=1$ $t=3, 4 \rightarrow n=2$ $t=5 \sim 8 \rightarrow n=3$ The "t"–"n" settings as discussed above offer an optimum relationship between the reverse-gamma correction characteristics of the R(G or B) reverse-gamma correctors 201R, 201G and 201B and the resolution of the R-, G- and B-error diffusion processors 301R, 301G and 301B shown in FIG. 22, thus reproducing images of a high quality with no waste of circuit performance (the number of lower bits used for error diffusion processing).

As disclosed above, the displaying apparatus as the fifth embodiment is provided with a plurality of the reverse-gamma correction characteristics each of which is composed of a straight line portion from the input gradation level zero to a predetermined input gradation level and a curve portion connected to the straight portion at the predetermined input gradation level, the gradients of the straight line portion being different according to the characteristics.

The plurality of the reverse-gamma correction characteristics are switched according to input signals, thus achieving effective image changing on screen.

Moreover, in working with switching of the reverse-gamma correction characteristics, the fifth embodiment is provided with switching of the number of lower bits used for error diffusion, which offers error diffusion optimum to the switched reverse-gamma correction characteristics.

Furthermore, the fifth embodiment is provided with the relationship between the reverse-gamma correction characteristics and the error diffusion as $t=2^n$ where the gradient of the straight line portion of the reverse-gamma correction characteristics in the low gradation level range is $1/t$ ($t \geq 1$), and the number of the lower bits used for error diffusion is "n" (the decimal places of "n" being rounded down if not an integer), thus offering an optimum relationship between the reverse-gamma correction characteristics and the resolution for error diffusion for reproduction of images of a high quality (with no waste of circuit performance for error diffusion.

What is claimed is:

1. An apparatus for converting a first input video signal having a first number of bits into a second video signal having a second number of bits that is smaller than first number of bits, for displaying an image based on the input video signal comprising:

an error detector to generate error data in response at least to a data portion of lower significant bits of the first number of bits of the first input video signal, the lower significant bits corresponding to a difference between the first and the second number of bits, the error data being obtained by multiplying the data portion by predetermined error diffusion coefficients according to pixel dots that surround a pixel dot composed of R(red)-, G(green)- and B(blue)-signal components of the first input video signal, at least one of the number of bits of the error diffusion coefficients for one of the R-, G- and B-signal components being different from the other number of bits of the error diffusion coefficients for the other signal components, the error diffusion coefficients being different from each other for the signal components for which the number of bits of the error diffusion coefficients is the same each other; and an adder to add the generated error data to the first input video signal, thus converting the first input video signal into the second video signal.

2. An apparatus of displaying an image based on an input video signal comprising:

a first processor to apply reverse-gamma correction to an input first video signal having a first number of bits, the reverse-gamma corrector having reverse-gamma correction characteristics representing a relationship between an input gradation level and an output gradation level, the characteristics being composed of a straight line having a gradient $1/t$ ($t \geq 1$) from an input gradation level zero to a predetermined input gradation level, the straight line being followed by a curve at the predetermined input gradation level; and a second processor to convert the first input video signal into a second video signal having a second number of bits smaller than the first number of bits, by generating error data in response at least to a data portion of lower significant bits "n" ($t=2^n$) of the first number of bits of the first input video signal, if "n" including decimal places, the decimal places being rounded down, the lower significant bits corresponding to a difference between the first and the second number of bits, the error data being obtained by multiplying the data portion by predetermined error diffusion coefficients according to pixel dots that surround a pixel dot composed of R(red)-, G(green)- and B(blue)-signal components of the first input video signal, the generated error data being added to the first input video signal.

3. A video signal processing circuit to process a video signal to be input to a display apparatus comprising:

a color saturation depression control signal generator to generate a color saturation depression control signal to be used to vary a color saturation depression amount to be used to decrease a color saturation level of the video signal;

a color saturation depression amount generator to generate a triangular shape signal representing the color saturation depression amount, based on the color saturation depression control signal; and a color saturation level decreasing unit to decrease the color saturation level of the video signal by subtracting the triangular shape signal from a color saturation level in a predetermined color saturation level range of the video signal.

4. The video signal processing circuit according to claim 3 further comprising a gradation level detector to detect a gradation level of the input video signal, wherein the color saturation depression control signal generator generates the color saturation depression control signal when the gradation level detected by the gradation level detector is within a predetermined gradation level range.

5. The video signal processing circuit according to claim 4, wherein the color saturation depression control signal generator generates a larger color saturation depression control signal as the gradation level detected by the gradation level detector becomes lower in the predetermined gradation level range.

6. The video signal processing circuit according to claim 4, wherein the predetermined gradation level range is a low gradation level range from a gradation level zero to a predetermined gradation level, and the predetermined color saturation level range is a low color saturation level range from a color saturation level zero to a predetermined color saturation level.

7. A video signal processing method of processing a video signal to be input to a display apparatus, comprising the steps of:

generating a color saturation depression control signal to be used to vary a color saturation depression amount to be used to decrease a color saturation level of the video signal;

generating a triangular shape signal representing the color saturation depression amount, based on the color saturation depression control signal; and decreasing the color saturation level of the video signal by subtracting the triangular shape signal from a color saturation level in a predetermined color saturation level range of the video signal.

8. The video signal processing method according to claim 7 further comprising the step of detecting a gradation level of the input video signal, wherein the color saturation depression control signal is generated when the gradation level thus detected is within a predetermined gradation level range.

9. The video signal processing method according to claim 8, wherein a larger color saturation depression control signal is generated as the gradation level thus detected becomes lower in the predetermined gradation level range.

10. The video signal processing method according to claim 8, wherein the predetermined gradation level range is a low gradation level range from a gradation level zero to a predetermined gradation level, and the predetermined color saturation level range is a low color saturation level range from a color saturation level zero to a predetermined color saturation level.

* * * * *